(12) United States Patent
Hughes

(10) Patent No.: US 8,396,863 B2
(45) Date of Patent: Mar. 12, 2013

(54) TEMPORAL CLASS LOADER

(75) Inventor: Bryan Hughes, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 767 days.

(21) Appl. No.: 12/326,785

(22) Filed: Dec. 2, 2008

(65) Prior Publication Data
US 2009/0248717 A1 Oct. 1, 2009

Related U.S. Application Data

(60) Provisional application No. 61/040,423, filed on Mar. 28, 2008.

(51) Int. Cl.
*G06F 17/30* (2006.01)
(52) U.S. Cl. .................................. 707/716; 707/736
(58) Field of Classification Search .................. 707/716, 707/736
See application file for complete search history.

(56) References Cited

U.S. PATENT DOCUMENTS

| | | | |
|---|---|---|---|
| 5,924,103 A | 7/1999 | Ahmed et al. | |
| 6,442,543 B1 | 8/2002 | Snodgrass et al. | |
| 6,684,215 B1 | 1/2004 | Saracco | |
| 6,691,097 B1 | 2/2004 | Saracco | |
| 6,845,392 B2 | 1/2005 | Koontz et al. | |
| 6,895,382 B1 | 5/2005 | Srinivasan et al. | |
| 6,996,707 B2 * | 2/2006 | Liang et al. ........................ | 713/2 |
| 7,158,991 B2 | 1/2007 | Kekre et al. | |
| 7,260,569 B1 | 8/2007 | Stegelmann et al. | |
| 7,343,628 B2 | 3/2008 | Buchholz et al. | |
| 7,346,628 B2 | 3/2008 | Porter | |
| 7,451,132 B2 | 11/2008 | Ruml et al. | |
| 7,644,427 B1 | 1/2010 | Horvitz et al. | |
| 7,711,746 B2 | 5/2010 | Bernal et al. | |
| 7,739,296 B2 | 6/2010 | Korn et al. | |
| 7,970,742 B2 | 6/2011 | Hanckel et al. | |
| 2004/0139116 A1 | 7/2004 | Porter | |
| 2005/0114404 A1* | 5/2005 | Pintar et al. ................... | 707/200 |
| 2005/0278303 A1 | 12/2005 | Ruml et al. | |
| 2006/0085456 A1 | 4/2006 | Pickering | |
| 2008/0163156 A1* | 7/2008 | Grey ............................ | 717/101 |
| 2009/0198815 A1 | 8/2009 | Saba | |

(Continued)

OTHER PUBLICATIONS

Castro et al., "Schema Versioning for Multitemporal Relational Databases", Information Systems vol. 22, No. 5, p. 249-290, 1997; Retrieved from the Internet<URL: http://www.sciencedirect.com/science?_ob=MImg&_imagekey=B6V0G-42SR5Y6-1-5H&_cdi=5646&_user=2502287&_pii=S0306437997000173&_origin=gateway&_coverDate=07%2F31%2F1997&_sk=999779994&view=.*

(Continued)

*Primary Examiner* — John E Breene
*Assistant Examiner* — Dennis Myint
(74) *Attorney, Agent, or Firm* — Kilpatrick Townsend & Stockton LLP

(57) ABSTRACT

A temporal relational database includes a relational database framework that allows for all the capabilities of a standard relational database with the addition of the concept of time. Transactions, which can be modifications of attribute values or changes to the database schema, can be stored with temporal histories. Through the use of these temporal histories, the temporal database is able to seamlessly respond to queries for times that are in the past, present, or future. Furthermore, transactions can be entered into the temporal relational database that are not effective until some point in the future, thus allowing for seamless migration of the data and schema of a database. Applications that access data in a temporal database may retrieve a time appropriate schema from the temporal database. An exemplary use of a temporal database to manage roles and responsibilities within an organization is described.

12 Claims, 14 Drawing Sheets

U.S. PATENT DOCUMENTS

| | | | |
|---|---|---|---|
| 2009/0248638 A1 | 10/2009 | Hughes |
| 2009/0248718 A1 | 10/2009 | Hughes |
| 2009/0248719 A1 | 10/2009 | Hughes |
| 2009/0248727 A1 | 10/2009 | Hughes |

OTHER PUBLICATIONS

=c&wchp=dGLzVzb-zSkzS&md5=ed68f3ffabfe39bdf28f2dfae7da8861&ie=/sdarticle.pdf>.*

Final Office Action for U.S. Appl. No. 12/326,794, mailed on Sep. 20, 2011.

Final Office Action for U.S. Appl. No. 12/326,782, mailed on Jul. 19, 2011.

Notice of Allowance for U.S. Appl. No. 12/326,789, mailed on Aug. 18, 2011.

Non-Final Office for U.S. Appl. No. 12/326,803, mailed on Oct. 6, 2011.

Buneman, P., et al., "Archiving Scientific Data", ACM Transactions on Database Systems, Mar. 2004, vol. 29, No. 1, pp. 1-42.

Non-Final Office Action of Feb. 15, 2011 for U.S. Appl. No. 12/326,782, 15 pages.

Non-Final Office Action of Jan. 25, 2011 for U.S. Appl. No. 12/326,794, 18 pages.

Non-Final Office Action of Dec. 22, 2010 for U.S. Appl. No. 12/326,803, 15 pages.

Office action for U.S. Appl. No. 12/326,803 (May 7, 2012).

Final Office for U.S. Appl. No. 12/326,782, mailed on Sep. 25, 2012.

Non-Final Office for U.S. Appl. No. 12/326,782, mailed on Jun. 4, 2012.

Gal et al. "A Multi-Agent Update Process in a Database with Temporal Data Dependencies and Schema Versioning," IEEE Transactions on Knowledge and Data Engineering, pp. 21-37 (Jan. 1998).

Moreira et al. "Schema Versioning: Queries to the Generalized Temporal Database System," Proceeding of the 10th International Workshop on Database & Expert Systems Applications, pp. 458-459 (Sep. 1999).

* cited by examiner

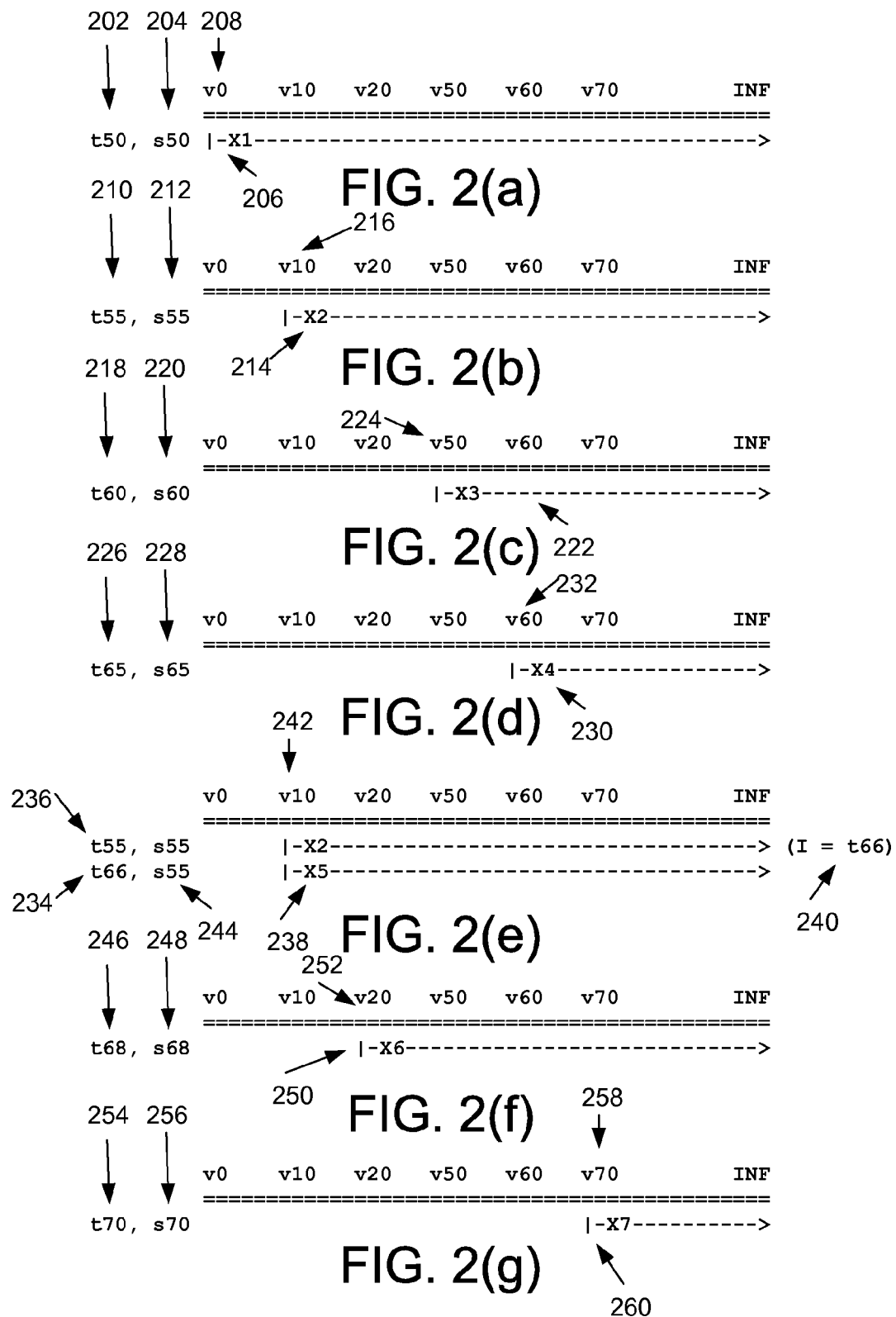

```
          v10     v15     v30         V50              INF
M         ==================================================
o
d    t10  |---------( person )------------------------>
e    t10  |---------( first_name )-------------------->
l    t15          |---------( home_phone )------------>
                                (home_phone becomes ineffective)
     t50            610 ────────▶|*********************>
------------------------------------------------------------

D    t20  |---------( first_name = Bryan )------------>
a    t30          |----( home_phone = 415-123-5432 )------>
t    t40             |--( home_phone = 510-654-7644 )-->
a
```

FIG. 6(d)

```
          v10     v15     v30         V50              INF
M         ==================================================
o             614 ╲                            ╱ 612
d                 ╲        ( home_phone )     ╱
e                  ▼                         ▼
l                  |-----------------|*********************>
                       (effective)        (ineffective)
                                      ▲
                                      ╲ 616
------------------------------------------------------------
D        (415-123-5432)| (510-654-7644)
a                  |---|----------------------------------->
t                    ▲   ▲                        ▲
a                    ╲   ╲                        ╲
                     618  620                     622
```

FIG. 6(e)

TEMPORAL CLASS LOADER

CROSS REFERENCES TO RELATED APPLICATIONS

This application claims priority to U.S. Provisional Application No. 61/040,423 filed on Mar. 28, 2008. This application is also related to application Ser. No. 12/326,782, entitled Temporal Relational Database Management System, application Ser. No. 12/326,789, entitled Applying the Use of Temporal Data and Temporal Data Models to Roles and Organizational Structures, application Ser. No. 12/326,794, entitled Future Modeling, and application Ser. No. 12/326,803, entitled Simply Querying Across Time, which are being concurrently filed on or about the same date as the present application. Each of these applications is hereby incorporated herein by reference for all purposes.

BACKGROUND

Relational databases are well known in the art. A relational database is a database that conforms to a relational model, and refers to a database's data and schema (the database's structure of how the data is arranged). A relational database is usually managed through the use of a Relational Database Management System (RDBMS). Many different RDBMS products are currently available, including ones produced by the assignee of the present application.

A user, by either directly querying the database or through an application program that queries the database, may ask questions of the database regarding the currently stored data and schema and receive responses from the database based on the data and model that is currently stored. As a simple example, consider a relational database that stores the employment information for employees of an enterprise. The database may contain information such as an employee id, a name, an address, a salary level, and any other information the enterprise deems relevant. A user can ask a question of the database, such as requesting a list of all employee ids of employees whose salary is less than a certain amount. The RDBMS will be able to process this request and return the answer to the user.

Present day RDBMS systems are well suited to answering questions about the data that is currently stored in the database, such as the question presented above. However, RDBMS systems are not well suited to answering such questions when presented with additional criteria, such as a time relationship. In many situations, a user will not need to ask questions of the database that reflect the current status, but may need to query the database regarding a status from the past, or potentially the future. Continuing with the example, a user may need to request a list of all employee ids whose salary was below a certain amount on a certain date in the past. This question cannot be answered by a query of the database as it exists today, because any number of events may have happened between the date of interest and the present. Employees may have received raises or reductions in salary, or employees may have been hired or fired, thus making the values stored in the database as of today unrelated to the values as they existed in the past.

Additionally, present day RDBMS systems are not well suited to answering questions across time when the underlying schema has changed. Continuing with the employment information database, consider the case where a new field of information is added to the schema of the database, such as a new field indicating an employees marital status. If the database is asked a question about an employees marital status six months ago, it would be unable to provide an accurate answer, as that particular field did not exist at the time of interest. Simply providing the status as it exists today would be inaccurate, as this may not reflect the true marital status of the employee as there is the potential the employee's status changed in the last six months. The most accurate answer may be that six months ago, the employee marital status was not known because that field did not exist in the database. However, because RDBMS systems today do not keep track of changes made to the underlying data model, it would be unknown when the marital status field was added.

There have been attempts to solve the temporal problem of RDBMS systems, however these solutions are all inadequate for a variety of reasons. For example, many database systems will keep an audit log of changes that have been made to data values across time. However, this does not provide for effective querying across time because every query would involve recreating the database through an enormous listing of audit logs. Additionally, many database systems will attempt to overcome the problem of changes in a database schema by taking periodic snapshots of the database as it exists at the time of the snapshot. This solution is ineffective because of ongoing changes in the values of the data currently stored, and a snapshot of the database may not reflect current realities. Additionally, applications that access the database are generally updated when a new database schema is deployed. Using the snapshot model requires not only saving multiple copies of the database for every point in time, but also multiple copies of all applications that access the database for every point in time.

Although there has been some research done in the field of temporal databases, this research has been focused on the problems associated with maintaining a temporal history of data values only. Although this may be useful in some situations, a fully temporal database must support not only temporal histories of data, but of the underlying model as well.

Embodiments of the present disclosure attempt to solve problems such as those mentioned above, as well as others that would be readily known to one of skill in the art.

BRIEF SUMMARY OF THE DISCLOSURE

Systems and methods in accordance with various embodiments of the present disclosure can overcome these and other deficiencies in existing relational databases.

In one embodiment, a method of responding to a query from an application to a temporal relational database implemented on a computer apparatus is presented. The method can include receiving a query at a temporal relational database. The query can indicate a point in time for which the temporal relational database should be reconstituted. The method can continue with obtaining a definition of a schema representing a structure of the temporal relational database. The definition can represent the structure of the database for the point in time indicated in the query. The definition can be further loadable by the application. The method also includes sending the definition of the schema to the application, wherein the application can use the definition to query the temporal relational database responsive to the point in time indicated by the query.

In addition to other methods that can be used in accordance with these and other embodiments, there also are a number of systems, computer products, and other such aspects for implementing, practicing, performing, or otherwise utilizing aspects of the various embodiments.

A further understanding of the nature and the advantages of the inventions disclosed herein may be realized by reference of the remaining portions of the specification and the attached drawings.

BRIEF DESCRIPTION OF THE DRAWINGS

Various embodiments will be described with reference to the drawings, in which:

FIGS. 2(a-g) illustrate an example of changes to a data value stored in a temporal relational database;

DETAILED DESCRIPTION

Figure 1:
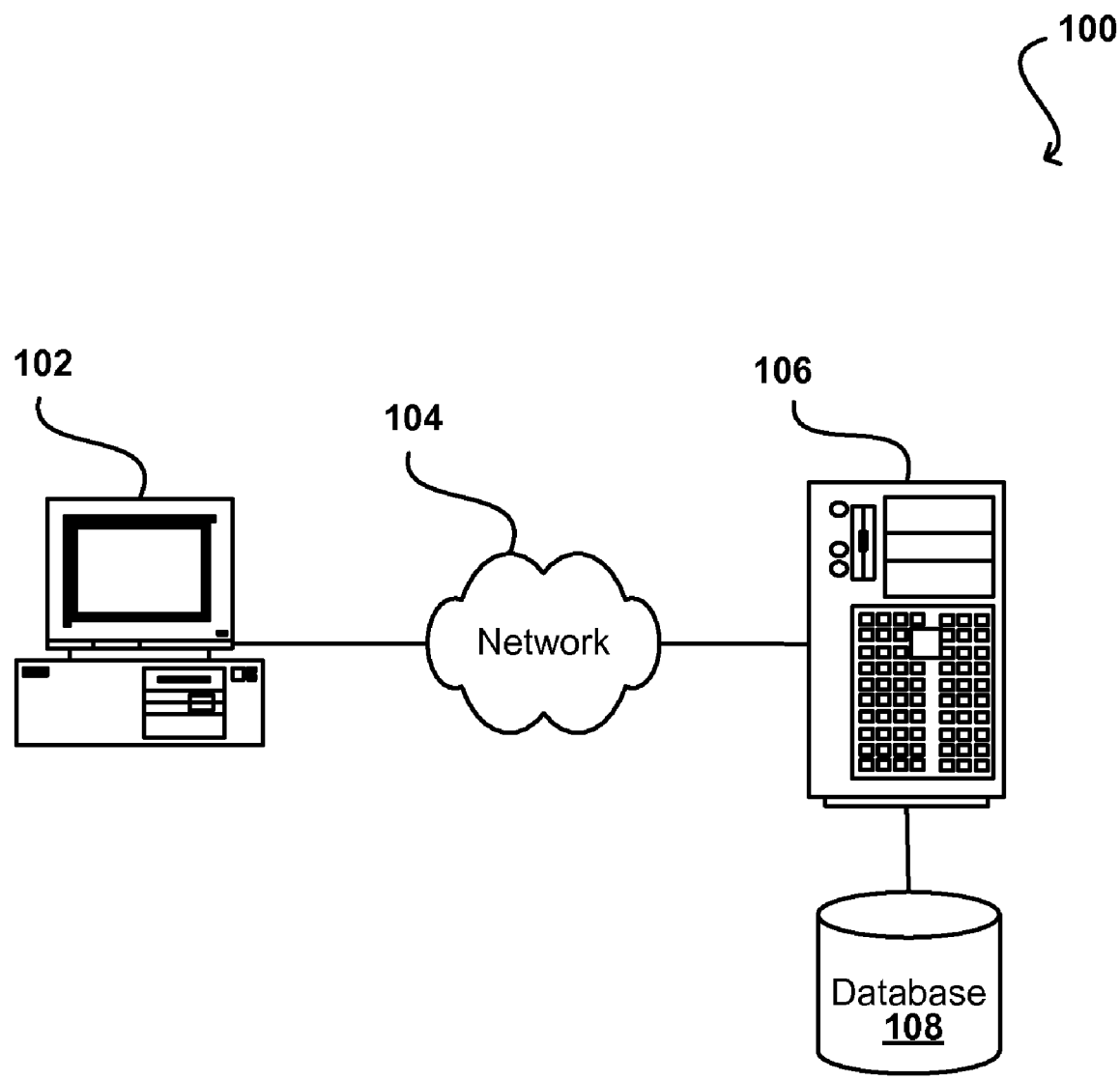
FIG. 1 illustrates an environment for implementing various embodiments.

Various embodiments of the present disclosure provide for the creation of a database that does not only store traditional data and data models, but also is able to store temporal data and temporal data models, including temporal histories related to the data and the data model. Using the stored temporal data with a temporal data model, the state of the database at any point in time can be readily determined, including both data values and structure for interpreting those data values, without any need to reconstruct any portion of the database for a particular point in time. Such an approach also allows for queries "across time," wherein multiple values can be determined for different points in time using a single query, with the data for each point in time being interpreted properly regardless of any changes in the database structure, etc. Temporal history also can include a time during which a value is valid; a time the transaction really occurred, a sequence time as to when the transaction should have occurred, and an event time indicating when the decision to alter the data or model was made.

Various embodiments allow an application to utilize temporal data that is stored in the temporal database. In one example, an application can be reconstituted in order to be compatible with the schema at any time in the past, present or future, by no longer associating the schema with the application itself. Rather, instructions as to how to load a schema are inserted into the application, and the actual schema itself is retrieved from the temporal database.

Various embodiments provide for use of a temporal database to track roles and organizational structures over time. The ability to query a database across time to determine which persons hold a given role at any time is provided for. Additionally, the ability to determine role changes, temporarily granting roles, and adding new roles with an effective date in the future is provided.

Various embodiments provide for the ability to model future events in the database. In addition to allowing the database to answer questions about future events, it allows for the database to seamlessly evolve from one data model to another. Changes to both the database and the database model can be entered with an effective date that is in the future. The database may then be queried based on what the state of the database will be in the future. This further allows for a seamless transition at the effective time of the database change, because there is no alteration of the database required, as temporal changes are handled within the RDBMS.

Various embodiments provide an ability to query the database across time. A user may specify criteria about at least one time period of interest, for example, and the database will be able to answer questions presented with respect to the state of the database as it would have existed at the time period(s) in question. This provides for the ability to ask questions of the database about the past, present, and future, using standard applications, and without resorting to the use of audit logs, or historical database snapshots.

FIG. 1 depicts an exemplary environment for operation of embodiments of the present invention. A computer 102 may host one or more applications that require access to a temporal relational database 108. The computer 102 may be of any suitable type and is further described with reference to FIG. 10. The computer 102 may be operatively coupled with another computer 106 which may provide access to the temporal relational database 108. The computer 106 is also further described with reference to FIG. 10. In some embodiments computer 106 and temporal relational database 108 may be housed within a single machine, while in other embodiments the functionality may be spread across multiple machines. A network 104 may operatively connect the computers and the temporal relational database. The network 104 may be in any suitable form, such as a local area network, a wide area network, or the Internet. The exemplary operating environment depicted in FIG. 1 is only one potential operating environment for a temporal relational database. As would be clear to one of skill in the art, any operating environment that is suitable for utilizing a non-temporal relational database would also be suitable for a temporal relational database.

Definitions

In order to better understand the concept of a fully temporal relational database as described herein, it is necessary to have an understanding of terms as used to describe the temporal relational database. A listing of some of the terms that may not be known by a person who is unfamiliar with concepts of temporal relational databases will be presented and defined below. Throughout this specification, reference will be made to time in the form of a number, with later times indicated by higher numbers. For example, time 50 occurs later than time 30. In many places, this numerical representation of time will be annotated with additional qualifiers, such as (v)alid time, (t)transaction time, (s)equence time, and (e)vent time. For example, v50 will indicate that a change occurred with a valid time of 50. The differences between valid, transaction, sequence, and event time will be described below.

"Existence"—In a temporal framework, entities and relationships exist and have state. While there can only be one existence of an entity or relationship, it can change states over the course of its lifetime. Once an entity or relation has been defined, it is said to exist. Once the entity or relation has come into existence, it will always exist, although the existence may become ineffective. The factual knowledge of existence of an entity or relation becomes permanent once the entity or relation is defined. If the entity or relation becomes ineffective, this does not change the fact the entity or relation did exist at some point. A simple example would be in the case where an entity type such as Person first becomes known to the system. Prior to this the entity did not exist. If at some later time the Person entity is no longer needed, this does not change the fact that the Person entity does still exist. The entity can simply be marked as being ineffective. The existence of the entity is identified in both valid and transaction history.

"State"—The state indicates if an entity or relation is currently effective or ineffective. Because entities and relations in a temporal database will always exist once created, there is a need to describe the various states an entity or relationship may currently be in. For example, two people at some point in time enter into a relationship which continues for a period of time. During this time the state of the relationship as well as the two entities is effective. After a period of time, the two people separate which causes the relationship to change into an ineffective state. The relationship still exists but has changed state. While existence and state applies to an entity or relationship, it is also applicable to the model which describes the entities and relationships. In this case, the entity is described by attributes. For example, at some point in time, the definition of the entity type of Person is described by a firstname and lastname. At some point later it is extended with the addition of the attribute nickname. Following some more time, the nickname is dropped from the entity definition. The way this change can be effectuated in a temporal database is to mark the attribute's state as ineffective. Once a fact is added to a temporal system, it can never be deleted, it can only be marked ineffective.

"Factual Validity"—Factual validity is the time interval that a certain fact is known to be true or valid. Factual validity can describe the validity of the fact's value, or of the fact's existence. A fact's value or existence is considered to be valid from a given point until it is changed as some other point. Returning to the ongoing example, assume entry of the new attribute nickname occurred at t10. Assuming that the entry was to take effect as soon as it was entered, the factual validity of the nickname attribute became valid at v10, when it was inserted. It should be noted that a fact's validity may or may not be concurrent with the time it is entered into the database. Again turning to the example, a person may have always had a nickname, but this was not entered into the database until time t15 with a valid time of v10. As such, the fact is valid at time v10, the time the nickname field was added, despite the entry not being made until a later point.

"Factual Predecessor and Successor"—In a temporal database framework a fact's value can change over time, and thus each fact can have a predecessor or a successor valid value. One potential way of modeling this is to store the fact's valid starting time. As such, the fact will be valid from its starting time until the time that a new value is entered with a later valid time. Using the example, a person could have a nickname entered at time t15 to indicate their nickname is Johnny. At time t18 the nickname could be changed to show that starting at time t18 the new nickname is Jon. As such, the factual successor is valid at time t18, which is also the end of the valid interval for the previous nickname Johnny. In this model the start time of a fact's successor indicates the end time of the fact's predecessor. Facts that do not have a successor continue on in time without bound. In this example, if there are no more changes to the nickname field, the value of Jon will remain valid until the end of time.

"Timelines"—Relational databases are comprised of the model that describes the data (schema) and the data itself. In a Temporal RDBMS, each one of these dimensions is versioned in their own time. Model Time describes changes to the model that describes the data. In the example, the model timeline that describes the nickname field would show that until time t10, the field did not exist. At time t10, the field was added. Then at time t20, the field may no longer be needed, and is marked as no longer being effective. Value time describes changes to the value of the data. In the above example, the value timeline would show that at time t15, the nickname of Johnny was entered. Then at time t18, the nickname was changed to Jon. Every change to the temporal database will be versioned in its own timeline. This versioning is tracked through the use of temporal histories, which is described below.

"Temporal History"—each of the timelines as described above will maintain a temporal history. A temporal history may include the following four elements:
  "Valid Time"—The valid time is the time from which the fact is known to be valid, or has factual validity;
  "Transaction Time"—The transaction time is when the change was made to the database;
  "Event Time"—The event time is when the decision was made to make a change to the database; and
  "Sequence Time"—The sequence time is when in transaction time the change should have occurred.

As will become clear, the various times for each of the histories are not necessarily the same. That is, the time of each element of the history can be independent of the values of the other elements. Examples of temporal histories will be discussed in detail with reference to FIG. 2.

"Sub-linear Pan Temporal Ordered"—A sub-linear pan temporal ordering is an ordering of timelines where the timelines are allowed to overlap. As such, for any given valid time, there may be multiple valid values for an attribute, or states for an entity or relationship. An example of sub-linear pan temporal ordering will be discussed with reference to FIG. 3(a).

"Linear Pan Temporal Ordered"—A linear pan temporal ordering is an ordering of timelines where the timelines are not allowed to overlap. In essence, a linear pan temporal ordering is a sub-linear pan temporal ordering collapsed into a single timeline. FIG. 3(c) is the linear ordered pan temporal view corresponding to the sub-linear ordered pan temporal view of FIG. 3(a) and will also be discussed further below.

"Database Reconstitution"—Database Reconstitution is a term that describes the temporal relational database's ability to manifest the data and model from any point in valid time. By using the temporal histories, the correct transactions can be selected to obtain the desired view of the database. The database is reconstituted for every operation by selecting the appropriate transactions from the over all time temporal histories. Database reconstitution should not be confused with database reconstruction, which may involve taking a static view of the database, and playing forward or backward changes from an audit log or some other such facility to recreate the database as it would have appeared a certain point in time. A temporal relational database exists over all time simultaneously, and is reconstituted for each operation to reflect the database and a specified instant in time.

Temporal Relational Database

In order to understand a temporal database, an understanding of timelines and temporal history can be beneficial. The following examples will provide a better understanding of these concepts and how they apply in a temporal relational database. Throughout the examples, time is referred to as a number (e.g., t10, v20) with higher numbers indicating later periods in time. It should be noted that this representation of time is for purposes of explanation and is in no way limiting as to implementation of a temporal relational database. In an implementation of the temporal relational database, time can be stored in any manner, such as the number of milliseconds since a known instant, that would be well known to a person of skill in the art.

FIGS. 2(a-g) illustrate an example of the data that can be maintained to establish a timeline and temporal history for an individual data value stored in a temporal database. This concept is presented first in order to build a foundation of the concepts of timelines required to understand a fully temporal relational database. The example begins with the creation of an attribute in a temporal database. The attribute can be used to store any number of values, but for purposes of simplicity, the attribute as defined will only contain a single value. Also, for purposes of the example, assume the present time is 70.

FIG. 2(a) depicts the entry of a value for the single attribute that is stored in the relation. For every entry that is made in a temporal relational database, a transaction time, a valid time, a sequence time, and optionally an event time will be associated with entry. The transaction time is the time when the entry was actually made in the temporal database. The valid time is the time from which that entry is valid, or has factual validity. These times are not necessarily the same, as an entry can be made at one time, but the entry is valid from either a time prior to or later than the time it was entered. The sequence time is the transaction sequence that the sub-linear values will be ordered by. For new values and value changes, the sequence time will be the same as the transaction time. In cases of correction, as will be shown later, the sequence time may differ from the transaction time.

In the example of FIG. 2(a), a new value for the single attribute is entered at transaction time t50 202. Because this is not a correction, the sequence time is set to be equal to the transaction time, resulting is a sequence time of s50 204. The new value is X1 206, and this value is valid from time 0, so the value of valid time is v0 208, indicating that this value is valid from the beginning of time. It should be noted that although the transaction time of this entry is t50 202, the entry is actually valid from a time v0 208, which is before the transaction time. Any entry made will have a valid time that begins at the specified valid time, and continues forever, or until another value is entered with a later valid time.

FIG. 2(b) now shows that the value of the attribute was changed at transaction time t55 210. The value of the attribute is changed from X1 to X2 214, and this change is valid from time v10 216. FIG. 2(c) indicates a change made at transaction time t60 218. The value is changed from X2 to X3 222, and the change is valid from time v50 224. Similarly, in FIG. 2(d), the value is changed again at transaction time t65 226. The value is changed from X3 to X4 230, and the change is valid from time v60 232. As was explained above, because none of the changes in value are corrections, the sequence 212, 220, 228 time for all the transactions is set to be equal to the transaction time.

FIG. 2(e) depicts the case where an error in data entry has been made. At transaction time t66 234 it is discovered that the value X2 entered at transaction time t55, with a valid time of v10 236, was incorrect. The correct value should have been X5 238. First, the record X2 is marked incorrect by setting the transaction time t66 as the 'invalidated at' time of the record X2 240. Next, the correct value is added, with a transaction time of t66 234 and a valid time of v10 242. The sequence time 244 is set to correspond with the transaction time of the incorrect entry 236. In this case, the sequence time will be set to time s55 244, because it was at transaction time t55 236 that the incorrect value was entered. The reason for setting the sequence time will become clear as the example continues.

FIG. 2(f) shows that at transaction time t68 246, sequence time s68 248 the value is changed to X6 250, at valid time v20 252 (still in the past). Because the valid start time of this change, valid time v20 252, precedes its predecessor's (X3 and X4) valid start times in valid history, this value will supersede when constructing the timeline as will be discussed with reference to FIG. 3. FIG. 2(g) indicates that at transaction time t70 254, sequence time s70 256, the value is changed to X7 258 at valid time v70 260. In this case, the change is finally current in real time.

It should be noted that for all of the transactions entered, the values are valid from the designated valid time, through infinity, or the end of time. As has been explained, a fact's value remains valid from its designated valid time until the value is superceded by a value with a later valid time. How this manifests itself will be discussed with reference to FIG. 3.

Figure 3A:
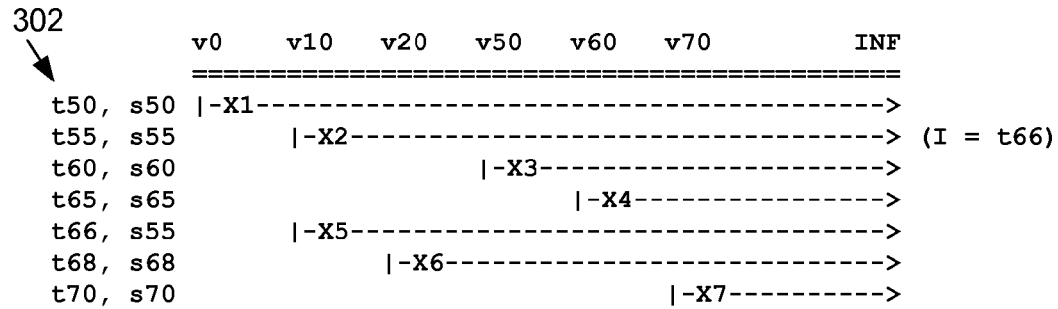
FIGS. 3(a-c) illustrate an example of sub-linear and linear ordered changes to data values in accordance with one embodiment.
Figure 3B:
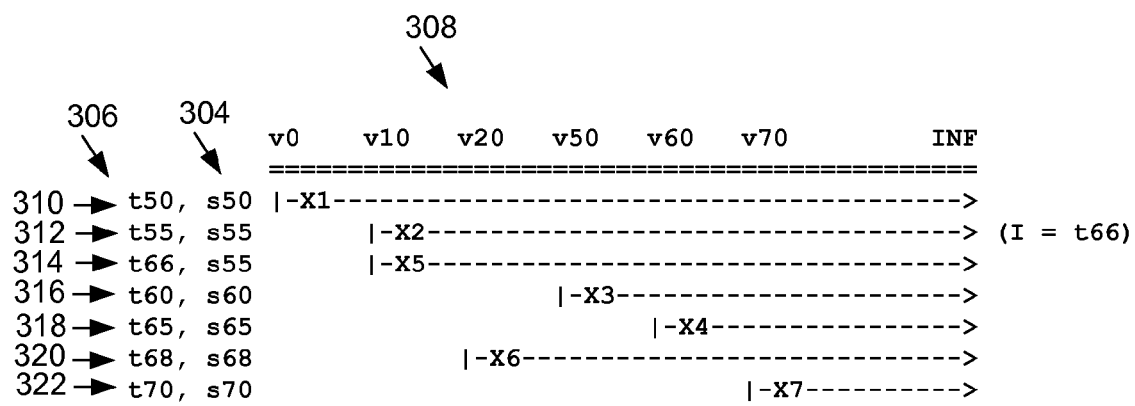
Figure 3C:
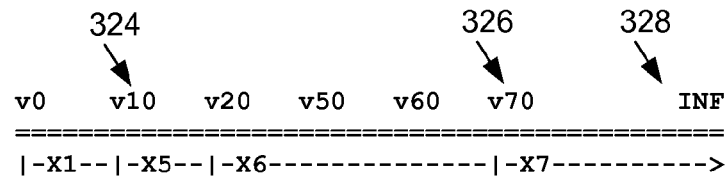

FIG. 3(a) depicts the sub-linear pan temporal values for the attribute discussed in FIG. 2. By ordering the data by transaction time 302, it makes it possible to reconstitute the values as they would have appeared to the database in the past. This process will be explained in more detail later in the example. In order to create a valid value timeline for this attribute, it is necessary to first decide the time in which to reconstitute the database. For simplicity, the example will first use the present, time 70, to reconstitute the database. First, all transactions with a transaction time greater than the time of interest, in this case time 70, will be removed. Then, the transactions are reordered by sequence time ascending 304, then transaction time ascending 306, then by valid time ascending 308. The reason for this reordering is so that corrections that were made to the database appear in the correct order for timeline creation. FIG. 3(b) depicts the time history after transaction selection and reordering.

The valid value timeline can be thought of as an array. Each transaction in the time history will be iterated and entered into the valid value timeline. Events that collide on a valid time will replace the event with which it collides. Events that are inserted into the timeline at positions other than the end of the array will erase array elements that occur later in the timeline. The first time 310 through the sequence ordered history as shown in FIG. 3(b) results in an array timeline with a single transaction:

timeline {(v0, X1)}

The second transaction 312 is then entered into the array, resulting in the array containing:

timeline {(v0, X1), (v10, X2)}

On the third transaction 314, there is a collision at valid time v10 on the values X2 and X5. When a collision such as this occurs, the value that is later in sequence time replaces the value that is currently stored in the array. As such, the array will now contain:

timeline {(v0, X1), (v10, X5)}

The fourth 316 and fifth 318 elements are entered without any special processing, because there is no collision in time, as they are being entered at the end of the array. The resulting timeline will be:

timeline {(v0, X1), (v10, X5), (v50, X3), (v60, X4)}

On the sixth transaction 320, the value X6 with a valid time of v20 was entered. This transaction should be entered into the timeline array between the valid time v10 and v50. As such, the transaction is entered, and all of the array elements that occur later than the transaction are removed. The resulting timeline is:

timeline {(v0, X1), (v10, X5), (v20, X6)}

Finally, on the seventh transaction 322, the last time is inserted at the end of the array:

timeline {(v0, X1), (v10, X5), (v20, X6), (v70, X7)}

The linear ordered pan temporal timeline array is depicted in FIG. 3(c). As is shown, the timeline now depicts the valid values of the attribute for all times as known by the database at the present time. The database can be asked questions about the valid value of the attribute at any time in the past, such as at valid time 10, where the valid value is X5 324. The database can be asked questions about the value of the attribute at present, such as at time 70, where the valid value is X7 326. It can also be asked questions about the valid value in the future. In that case, because there is no superceding value that exists in the time line, the last known value, X7, continues on into the future 328, or until it is superceded by a new value.

Although the example as presented above allows for the database to answer questions regarding the valid value of an attribute at some time in the past, based on the current state of the database, what is still missing is the ability to ask the database questions about the past, and having the database respond as it would had the question been asked in the past. To highlight this point, if time v20 is examined in FIG. 3(a), it can bee seen that depending on the time the database is asked the question, three separate values may be returned. If the database were asked the question at time 55, the value X2 would be retuned. At time 66, the value X5 would be returned. At time 68, the value X6 would be returned. Because a temporal database maintains temporal histories for every transaction, this problem is easily overcome, as will be described in the next example.

Figure 4A:
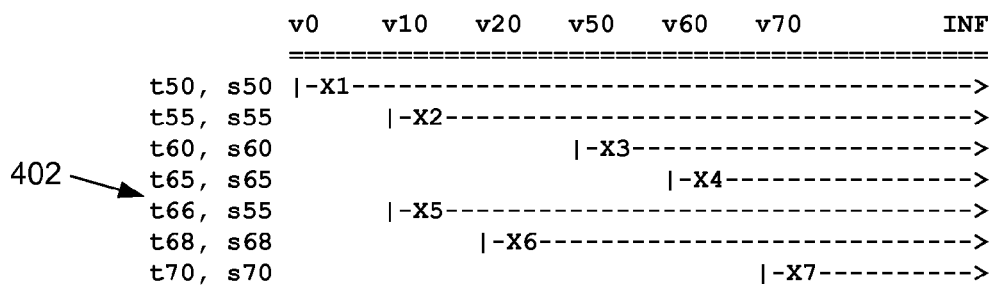
FIGS. 4(a-d) illustrate another example of sub-linear and linear ordered changes to data values in accordance with one embodiment.

FIG. 4(a) is simply a copy of the sub-linear pan temporal ordered history as presented in FIG. 3(a). In order to reconstitute the database as it would have appeared in the past, it is a straightforward matter of filtering all transactions that occurred after the time of interest. From there, the same process that was described above can be used to create a valid value timeline as it would have appeared at the time of interest. For example, if it is desired to find out what the value of the attribute was at time v20, using the database as it looked at time t65, the temporal history could be filtered to exclude all transactions with a transaction time later than t65 402. The filtering of transactions can also be referred to as reconstituting the database. The result after filtering appears in FIG. 4(b).

Figure 4B:
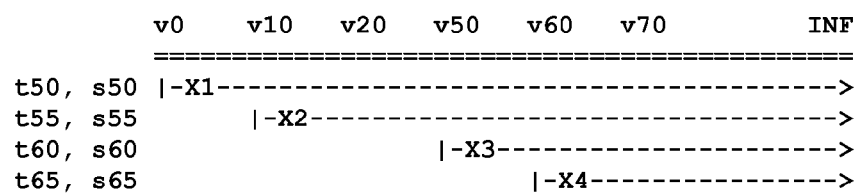
Figure 4C:
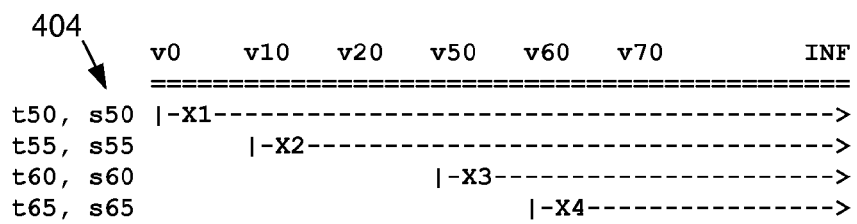
Figure 4D:
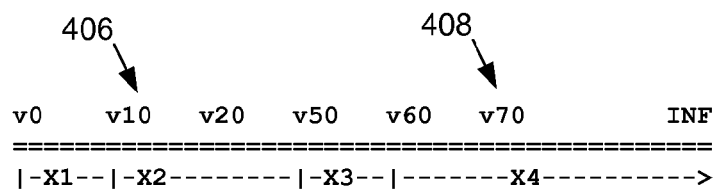

The resulting temporal history as shown in FIG. 4(b) is then reordered according to sequence time 404, as shown in FIG. 4(c). However, because in this case, there was no correction of data due to an error, the sequence time reordered temporal history of FIG. 4(c) is the same as the transaction time filtered temporal history of FIG. 4(b). Using the procedure to create a valid linear ordered pan temporal value timeline as described above, a valid value timeline resulting from that procedure is depicted in FIG. 4(d).

The database can now be queried to answer questions about the value of the attribute at various valid times and the database can now answer questions as it would have had the questions been asked in the past. For example, the database can be asked what was the valid value of the attribute at time v10, looking at the database as it existed at time 65. Looking at the valid value timeline as presented in FIG. 4(d) the database would answer that the valid value is X2 406. If asked the same question about what the valid value is at present time (which we have defined as 70) given the state of the database at time t65, the database would answer with value X4 408.

Although the example above describes temporal histories as applied to an attribute value, temporal histories also apply to the data model, or schema, in a temporal relational database. That is, every transaction that involves creating, removing, or changing an entity or relation from a temporal model will also maintain a full temporal history, which may include the transaction time, the valid time, the sequence time, and the event time. A temporal history for a schema change operates in a similar fashion to that of an attribute value change. However, there is one difference in that changes to entities or relations in a temporal relational database will maintain an additional item in their temporal histories. The additional item is the current state of the entity or relation, which can either be effective or ineffective. Because the database must be able to be reconstituted at any point in time, when transactions occur that would delete items from the database, the items are not actually deleted. They are simply marked with their state as being ineffective. As such, the model changes always exist in the database, but are simply marked ineffective when they are no longer needed.

Figure 5:
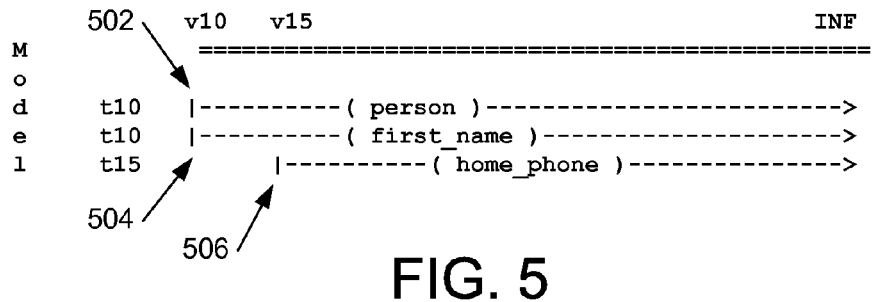
FIG. 5 illustrates an example of temporal information related to a data model change in accordance with one embodiment.

FIG. 5 depicts an addition of a new entity into the temporal model. For purposes of clarity, only the transaction time and valid time are shown, but it should be understood that all of the temporal history values could also exist for this entity. At transaction time t10, with a valid time v10, a new entity called a person is described to the system 502. At the same transaction and valid time, an attribute, first_name 504 that belongs to the entity person is also added. At a later transaction time t15, with a valid time of v15, another attribute, home_phone 506, is added to the person entity. Because these transaction are all entered with complete temporal histories, the data model can be manipulated with respect to time in the same manner as attribute values are manipulated. Valid model timelines can be created, the database can be reconstituted at any point in time to show what the model timeline would look like, and queries across any valid time can be performed.

Figure 6A:
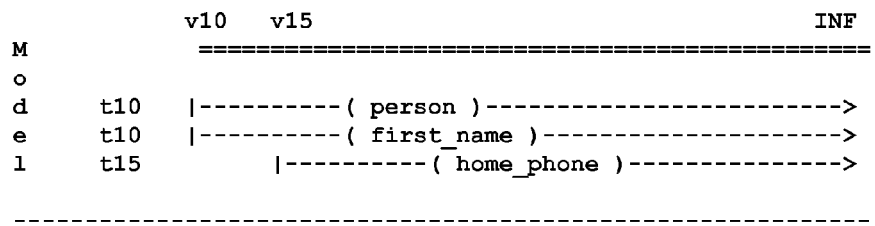
FIGS. 6(a-e) illustrate an example of a change to a temporal relational database involving a data and model change in accordance with one embodiment.

FIG. 6(a) depicts a temporal database when viewed from both the model and value temporal histories. Because the temporal framework may describe four histories: valid-time, sequence-time, event time, and transaction-time in two timelines: value (data) and model, it is critical that the system guarantees that the model and value timelines histories intersect. Because the data (values), which has its own valid time history, is described by the model, which also has its own valid time history, means that the two histories are intersected for every operation. This means that filtering on this intersection guarantees that only those model and data objects that existed at the same time in valid history are seen. For purposes of simplicity, the sequence and event time has been omitted.

When selecting from the Person entity (table), the system ensures that only those objects that intersect in valid time are part of the selection. At transaction time t20, an instance of a person is added with a valid time of v10 with a first_name of 'Bryan', also added at valid time v10 602.

Now at transaction time t30, a home_phone value of '415-123-5432' is added with a valid time of v10 604. This will fail because at valid time v10, the domain describing the home phone attribute did not exist—there is no intersection in valid time. The system would throw an EXISTENCE CONSTRAINT, which will be more fully described below. Instead of a valid time of v10, the home_phone value may be added at valid time v15 606, where there is an intersection in valid time. In other embodiments, the entry of the value may be rejected completely if there is no intersection in valid time between the data and value timelines.

Figure 6B:
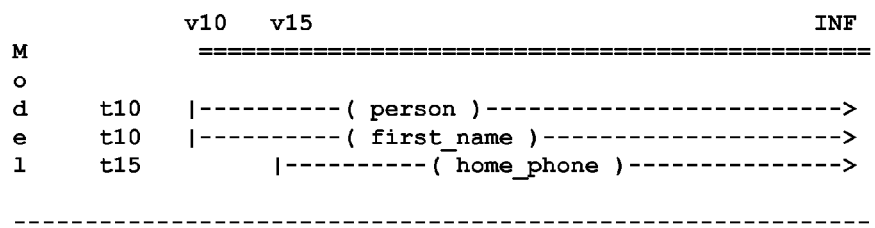

When this instance of a person is selected at valid time v10, the results only include the first_name. If the person is selected at valid time v50, then the results would include the columns first_name and home_phone with the values, Bryan and 415-123-5432. This is depicted in FIG. 6(b).

Now, assume the phone number changes 608 at valid time v30 to '510-654-7644'. Reselecting the person at valid time 50, would now yield two columns: first_name and home_phone, but with the values Bryan and 510-654-7654. This is depicted in FIG. 6(c)

As has been mentioned above, an entity or relation is never deleted from a temporal relational database. The entity or relation will always exist once it has been created. However, the entity or relation can change state from effective to ineffective, or any other appropriate state. In one embodiment, an ineffective state has the same result as a deletion, because the entity or relation is no longer capable of participating in the data model. However, the entity or relation is never removed from the data model, as it is still necessary to answer questions from the database at those times where the relationship was still effective, and also to handle the possibility that the entity or relation may once again become effective.

Figure 6C:
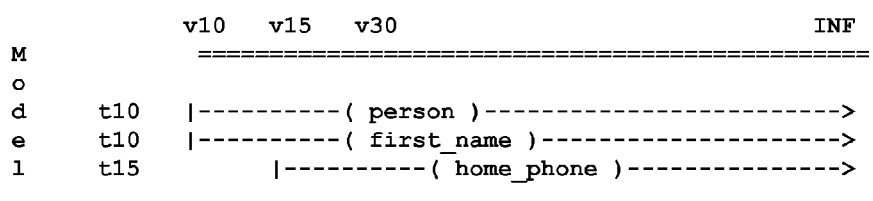

FIG. 6(d) depicts the same sub-linear pan temporal ordered model and value timelines as shown in FIG. 6(c) with one addition. At transaction time 50, with a valid time of 50, it is decided that the home_phone field is no longer needed 610. The field can not be removed, but it can be marked to show that as of time 50, the home_phone field has become ineffective. As such, after time 50, the home_phone field can no longer participate as an entity or a relation.

FIG. 6(e) depicts the linear pan temporal ordered timelines of the model and data over all time. For the sake of clarity, only the home_phone field 612 is shown. It can be seen that from the model perspective, the home_phone field is created at time 15 614. This field will always exist, but at time 50 the field becomes ineffective 616. The home_phone value timeline appears just as it did in FIG. 6(c), such that from time 15 to time 30, the value 618 is (415-123-5432), but from time 30 onwards, the value 620 is (510-654-7654). However, as has been explained previously, every operation in a temporal database must intersect in valid time. Thus, if the database is queried to return the home_phone value between times 15 and 50, an actual value will be returned, because there is an intersection between the value timeline and the model timeline. However, after time 50, the home_phone field is no longer effective. Because there can not be an intersection in valid time 622 after time 50, any query of the database for a home_phone number after time 50 will fail.

The examples above have illustrated many of the concepts of a temporal history. First, the interaction between a data value and its temporal history were discussed. Then the concepts of a temporal history were expanded to explain how a temporal history applies to a data model change, such as adding a new entity, with new attributes. The concept of effective and ineffective states when dealing with model changes was introduced. Next, the interaction between an entity, the attributes that make up that entity, and the values that populate the attributes of the entity were described in relation to the effective state of the entity and attributes and the value timeliness In order to have a fully operational temporal relational database, there is one remaining concept that must be described, and that is the relationships between entities.

FIGS. 7(a-b) depict the linear ordered pan temporal timeline of a relationship between two entities. For purposes of clarity, the entities and their relationship between the entities are shown with only the effective state of the entity as a whole. However, it should be clear that each entity may have one or more attributes, with each attribute having its own effective state. Furthermore, each entity and any associated attributes will also maintain a full temporal history that can include valid, transaction, sequence, and event times. FIG. 7 has been simplified to focus on the concept of a relationship between two entities, and how that relationship can have an effective state in and of itself, as well as having a "real" effectiveness based on the effective states of the entities that make up the relationship. Although the relationship shown in FIG. 7 nominally depicts a one to one relationship, it should be clear that the same concepts apply to any other relationships, for example one to many and many to many relationships.

Figure 7A:
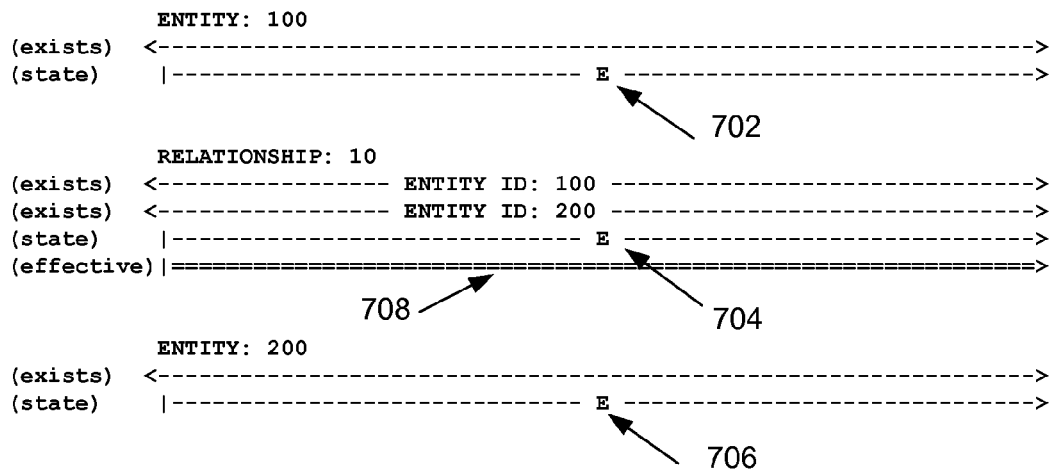
FIGS. 7(a-b) illustrate an example of a change to a temporal relational database involving a relationship between two entities in accordance with one embodiment.

FIG. 7(a) depicts a relationship 10 between two entities 100, 200. For example, entity 100 and 200 may be a person entity, and the relationship between them could be a mentor-mentee relationship. Both entities and the relationship exist from the beginning of time for purposes of this example. The entities are all effective, as denoted by the E in the state timelines of both entities and the relationship 702, 704, 706. Furthermore, because there is an intersection in time between the effective states of the entities and the relationship, the relationship has "real" effectiveness 708, as depicted by the "=" signs in the effective timeline associated with the relationship.

Figure 7B:
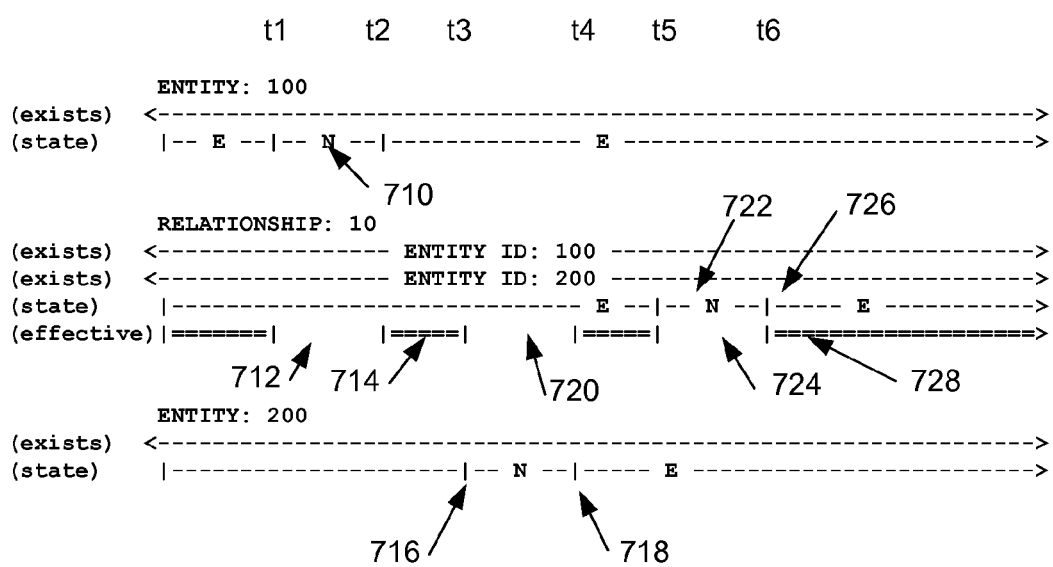

In order for a relationship to exhibit "real" effectiveness in at least one embodiment, there must be an intersection in the state timelines of all the parties involved in the relationship, as well as the relationship itself. In other words, if any of the entities involved in the relationship, or the relationship itself ceases to have an effective state, the entire relationship will no longer have a "real" effective state. FIG. 7(b) depicts the result on the "real" effectiveness of a relationship based on changes in the effective states of the parties involved in the relationship. In this example, entity 100 may be a person entity designated as the mentor and entity 200 may be a person entity designated as a mentee, and relationship 10 is the assignment of mentor 100 to mentee 200. At time t1, entity 100 changes state to become ineffective as depicted by the N in the state timeline of the entity 710. This change can occur for any number of reasons, such as entity 100 going on a leave of absence. The result of this is that the "real" state 712 of the relationship between entities 100 and 200, as depicted in the effective timeline of the relationship, can no longer be effective, because there is no longer an intersection in effective state between all the entities involved in the relationship.

As depicted at time t2 in FIG. 7(b), entity 100 has now changed back to the effective state. Because the other entities in the relationship remained in the effective state, the relationship immediately returns to a state of "real" effectiveness 714 because there is now an intersection in effective state between all three entities. A similar set of circumstances exists at time t3, where entity 200 changes from effective to ineffective states 716, and then changes back to an effective state 718 at time t4. As explained above, in order for the relationship to maintain a "real" effective state, all participating entities in the relationship must have an intersection in their effectiveness timeliness Because there is no intersection, the "real" effective state of the relationship is ineffective 720.

From the previous example, it should be clear that entities maintain a state, and that state can be effective or ineffective. In order for a relationship to achieve "real" effectiveness, all of the entities participating in the relationship must be effective. In addition to entities maintaining a state, all relations in a temporal relational database also maintain a state. For example, at t5, the relation 10 changes state from effective to ineffective 722. In the mentor-mentee example, this may be due to canceling the program. The "real" effectiveness of a relationship depends on the effective states of all the entities involved in the relationship, and the relationship itself. As depicted between t5 and t6 in FIG. 7(b) because the relationship 722 itself is no longer effective, the "real" effective state 724 of the relationship becomes ineffective. Similarly, at t6, when the relationship becomes effective again 726, for example the mentor-mentee program is reinitiated, the relationship will once again achieve a state of "real" effectiveness 728.

In addition to temporal histories for values and models as discussed above, a temporal relational database will also maintain temporal constraints. A constraint in terms of relational databases is well known and generally encompasses restrictions that are placed on transactions that are performed on a database. An example of a constraint that may be placed on a relational database may be to limit the values of an attribute to a specific range. For example, an attribute may be defined as an integer and there may be a constraint imposed that requires the integer to be between the values of 1 and 10. Any attempt to enter a value outside of this range will result in the constraint being violated and the transaction will be rejected.

One such temporal constraint, an Existence Constraint, was briefly discussed above. An existence constraint will not allow transactions to occur when there is no intersection in valid time of the values, entities, or relationships involved in the transaction. As was explained above, an attempt to assign a value to an attribute, where the value has a valid time that does not intersect in valid time with the effectiveness of the attribute will result in a violation of an Existence Constraint. In some embodiments, an attribute that is not effective at a given time can not have values assigned to it at that time.

Another value of a temporal constraint is a Non-Disjointed Constraint, which may require that any attributes pan temporal beginning valid value must intersect with the beginning instance of the entity as defined by its first and last known states. In essence, this means that if an attribute is defined, it must have a value defined as long as the attribute is effective. There can be no period of time where the attribute is effective, with no value assigned. In some cases, it may be desired to allow such an attribute to have a Nullable constraint which will allow the value to be entered as a Null value, thus satisfying the Non-Disjointed constraint.

Another example of such a constraint is an Effective Constraint, which may declare that temporal objects, such as a relationship, must intersect at some point in valid time. For the case of a relationship, this would mean that the "real" effective state of the relationship must be effective at some point in time or the relationship will not be allowed. Such a constraint can prevent relationships from being entered that will never achieve real effectiveness. Yet another type of constraint may be a Intersection Constraint. An Intersection Constraint declares that temporal objects must intersect at some point in model time.

A Continuous Constraint may declare that an attributes pan temporal values are not allowed to have any gaps in their valid time range. In essence, this means if an attribute is defined and is effective, there must be a value associated with the attribute for all periods the attribute is effective.

A Non-Overlapping Constraint may declare that an attributes pan temporal value may not overlap the attributes effective state. In essence this means that if a attribute becomes ineffective, no values may be stored for the attribute during the period of ineffectiveness. For example, if an attribute exists, and has values assigned to it, the values must be removed before the attribute can be marked as ineffective.

Although several examples of temporal constraints have been listed, a temporal relational database may implement any number of additional or alternative temporal constraints. Further it should be noted that for many constraints, the conditions in the constraint are specified by the user(s) of the temporal relational database. As such, the constraints themselves take on the characteristics of data and the constraints themselves will be stored with a complete temporal history. An example of such a situation may occur when the bounds of a constraint change at a particular time.

As an example, consider an entity that describes an employee. For purposes of clarity, the entity will be defined as containing two attributes, an employee ID and a Hourly Wage. A constraint may require that the Hourly Wage be above the minimum wage. At some later time, the minimum wage may be increased. A temporal constraint may specify that at the time of the minimum wage increase, no Hourly Wage value may be less than the increased minimum wage value, and that change is to take effect concurrently with effective change in the minimum wage. As with all other values, relationships, and entities in a temporal relational database, there must be an intersection in valid time. If this new constraint was entered with a valid time in the future, and at least one employee record contained hourly wages that are below the new minimum wage, the constraint would be violated, because at the time the new constraint becomes valid, at least one value for Minimum Wage would be too low. A temporal relational database can enforce such a change by either asserting a violation of the constraint when the valid time for the constraint change has been reached. In the alternative, the temporal relational database may not allow the constraint change to be entered unless the data subject to the constraint would satisfy the constraint at the valid time of the constraint change. In terms of the example, in order to set the Minimum Wage constraint to the higher value, with that value becoming valid at a certain time, all the Hourly Wage values subject to the constraint at that certain time must exceed the higher value.

With the addition of the temporal concepts, such as temporal histories, intersections in valid time, effective states, and temporal constraints, it is possible to create a relational database that is a temporal relational database. In some embodiments, the temporal layer may be an abstraction layer that is disposed between the user layer and the relational database management system (RDBMS). This may mean that the temporal layer will act as its own RDBMS and utilize an underlying relational database for purposes of data storage only. In other embodiments, the temporal layer may be integrated into an RDBMS system itself. In either case, to the end user, the temporal relational database operation is transparent. Maintaining all of the temporal characteristics will be handled in either case.

With a complete set of temporal characteristics, that identifies both data and model changes in timelines, operation of a temporal database should be clear from the above description. Every operation in a temporal relational database requires that the various timelines involved in the operation be intersected in valid time. In some cases, this may involve reconstituting the database at a specified valid time, while in other cases, it may just be necessary to ensure that an intersection in valid time occurs. Further it should be clear that a temporal relational database is a superset of the functionality of a relational database. That is to say that all of the capabilities of a relational database will also be found in a temporal relational database, in addition to the temporal aspect.

A temporal relational database provides several advantages over a standard relational database. In addition, a temporal relational database provides some challenges to the users of the database as well as those who design applications that desire to access data stored in the temporal relational database. Some of these challenges and capabilities will be presented below to further highlight the operation of a temporal relational database.

Temporal Class Loader

As has been described above, a fully temporal relational database provides for capabilities that greatly exceed those present in today's RDBMS systems. With this dramatic increase in the capabilities of the temporal RDBMS system also comes several challenges with regard to use of the system to obtain answers to questions asked of the database. In addition to the normal set of capabilities that are required to access any relational database, a user performing a query or application accessing a temporal database must also be designed to take into account that the database no longer reflects a set of data and a model at any given time, but rather the data and model span all times, past, present and future. This presents several challenges to the database application designer, some of which are presented below.

One challenge presented by the fully temporal database model is that all the versions of the database schema, as the schema evolves over time, are available at all times. In the past, changes to the database schema would involve a corresponding change to any applications that use the database to ensure that the schema that is used by the application corresponds to the current schema of the database. This paradigm is no longer applicable in the temporal database model, as the database schema is no longer fixed at some period of time, but rather can be reconstituted at any point in time: past, present, or future. Although it may be possible to design applications such that the database schema for all modifications to the database are present in the application, this would result in extraordinary maintenance and versioning problems when dealing with applications that interface with temporal databases. Every change to the temporal database schema would result in a corresponding change to any applications that access the database. Applications would no longer be able to discard schema as changes are made, because the old (or potentially future) schema may be necessary for queries that may be done at a later time and which would require older or newer versions of the schema.

Figure 8A:
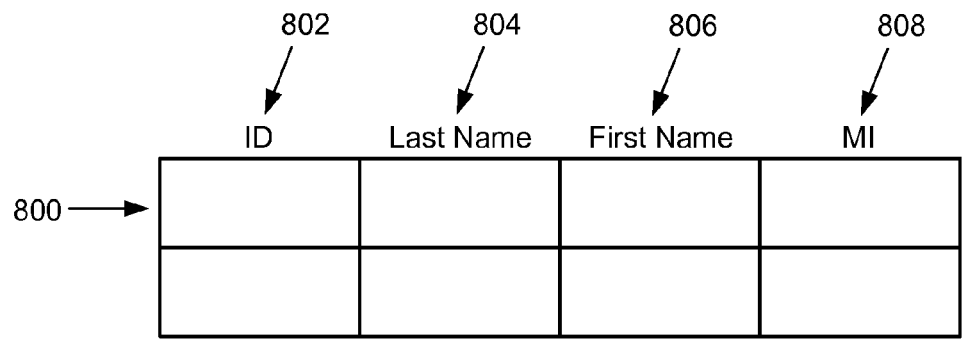
FIGS. 8(a-c) illustrate an exemplary data structure that can be used in accordance with one embodiment.

This challenge and one solution with respect to a temporal database may be better understood by way of an example, as is presented beginning with FIGS. 8(a-b). FIG. 8(a) depicts a simplified employee information database for an organization. Each employee record 800 comprises a number of different fields, such as employee id 802, last name 804, first name 806, and middle initial 808. For purposes of this highly simplified example, these will be the only fields that are currently stored in the employee information database. Additionally for simplicity, the schema will be assumed to exist from the beginning of the database (time zero).

A simple application that makes use of the database may be an application the queries the database and prints a report of all information about each employee. In order to do this, the application will need to know what data fields are stored in each record in the database. In this example, the application would need to know that an employee record 800 comprises a employee id 802, a last name 804, a first name 806, and a middle initial 808.

Figure 8B:
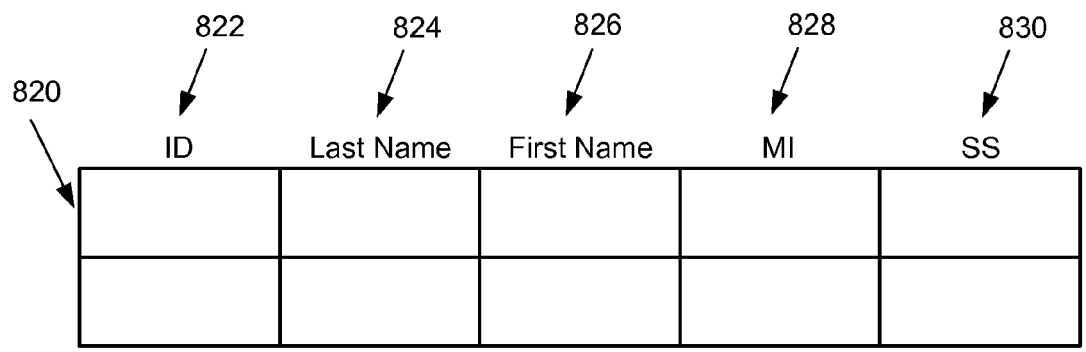

At some later point in time, a change to the database schema may be made to add a new field, the employee social security number 830, to the employee database. This change is depicted in FIG. 8(b). As should be clear, the application as defined in the previous paragraph would no longer be functional, as it would be unprepared to deal with the new social security number field 830 that has been added to the employee database 820. As such, the application would also need to be modified to reflect this change to the database schema. As should be clear, this presents a problem in and of itself, as each time the database schema is changed, a new version of the application is necessitated.

The problem is further exacerbated in the context of a temporal database, because a temporal database needs to not only answer questions, in this example produce a report, which reflects the state of the data as it is now, but must also be able to answer those same questions with respect to how the database looked in the past or future. Returning to the present example, if the application were modified to reflect the current state of the database, including the social security number 830, the report produced would be sufficient for all queries that asked for employee information after the change occurred, when the social security field 830 was added. The problem begins when a report for employees as it would appear at a time in the past is requested. The application will be expecting data from the database that includes a social security number 830, however at the time in the past, a social security number 830 was not a valid field in the database.

One potential solution to this problem would be to maintain many different versions of the application, so that when performing queries, the version of the application that corresponds to the schema of the database at the time of interest for the query is used to perform the query. So, for the above case, two separate versions of the application would be maintained. A user wishing to perform a query at times before the addition of the social security number would use the older version of the application, and users wishing to perform the query at times after the addition of the social security number would use a later version of the application. Every change to the database schema would require a new version of the application to be created and maintained. As should be clear, maintaining this type of structure in a database environment of even the most trivial size would be quite difficult.

Another potential solution would be to store every version of the database schema, along with the times that version of the schema is valid, within the application itself. Although this may alleviate the problem of the application using a schema that is not synchronized with the database for the period of time over which a query is performed, it still does not resolve the problem that every single change in the database schema would require a corresponding change in all applications that access the database.

Embodiments of the present application solve this problem and others through the use of a class loader. As is well know in the software arts, a class can be thought of as the definition of an entity that contains both the structure of the entity as well as interfaces to the entity. The structure of the entity, as used in reference to the temporal database can be considered the schema of the database. Interfaces to the class can be thought of as operations that are available to be performed on the data elements that make up the schema of the class. Depending on the particular programming language used, a class may be defined, and the definition may be compiled, or otherwise transformed, into a machine readable and loadable section of computer code. For example, in the Java programming language, a class may be defined using standard Java programming, and compiled into bytecodes that can later be loaded and understood by a Java application. Embodiments are not limited to Java however, as most modern programming languages have the ability to pre-compile classes and store the output in a format that is later loadable by an application.

A temporal database may make use of classes by allowing the pre-compiled class definition that corresponds to a particular schema of the database at a particular instant in time to be stored in the temporal database itself. Any time a schema change is made to the database, a new class definition can be compiled and stored in the database, indicating the time for which the class definition is valid, the time the class definition was created, etc. The class definition simply becomes an additional piece of data that is stored in the temporal database, having all the temporal attributes that have been previously discussed.

In an alternate embodiment, the class definition may not be stored in the temporal database at all, but may be generated at the time of use by the application. An application may query the temporal database, the query indicating the time the database should be reconstituted and the time to be considered for the query. The temporal database may then reconstitute the data model as it would have looked at the time in question, using the mechanisms that have been described above. The model my then be translated into a format understandable by the application (e.g., the model is real time compiled into Java bytecodes).

An application that needs to access data in the temporal database would no longer be required to know anything at all about the structure of the database at the present time, or at any time in the past or future. The application would rather be created such that it no longer contains definitions of the schema in the application, but rather it implements a class loader. The class loader will allow the application to retrieve from the database the class definition that would be appropriate for the query that is currently being performed, at the time that it is being requested by the query. The operation of a class loader with respect to a temporal database may be better understood by way of the following example, which builds on the example above.

Returning to the simple employee database of FIG. 8(a), a class can be created that contains the structure of the databases current schema. In this example, the structure would contain the four elements: employee id 802, last name 804, first name 806, and middle initial 808. The class definition may also contain an interface function, such as one that will output all the data elements that define an employee record 800. This class structure can then be compiled and stored in the temporal database with all the attributes that would be present for any piece of temporal data. Similarly, at a later time, when the new field social security number 830 is added, as in FIG. 8(b), a new class definition can be created, compiled, and stored in the database. In an alternate embodiment, the class structure is not compiled at the time of the schema change, but rather is compiled upon an application request.

Turning now to the example application that queries the database, and prints out a report containing all the fields for every employee. The application would no longer be written with a specific database structure contained within the application code. Rather, the application would be written to contain a class loader. The application would make use of the class loader to first retrieve the proper class definition that had been previously stored in the database or real time compiled.

The application could then perform queries, and utilize the interfaces to the class to accomplish the application tasks. For example, a user could run the application, and request a report of all employee data at a time prior to the addition of the new field. Utilizing the temporal database, the class loader in the application would first request the class definition that is valid at that time from the database. After this definition is retrieved, the application can perform the database query, and then simply call the interface function that outputs all the elements of the employee record 800. In this case, the values stored by the database do not include a value for a social security number. As such, the report generated would not contain values for employee social security numbers.

At some later time, the user may wish to perform the same query, although this time, the user may wish to have a report of all employee data at a time after the social security field was added. The same application, without any modification, would follow the procedure as above. That is, the class loader would first query the database to retrieve the valid class definition at the specified time. As should be clear, at that time, the social security field 830 has already been added to the database schema, and as such, is reflected in the class definition. The application would then perform the database query, and again simply call the interface function that outputs all the elements of the employee record 820. In this case, the values stored by the database do include a value for the social security number 830. Accordingly, the report generated would contain values for the social security number.

As should be clear from the example presented above, through the use of a class loader, an application interfacing with a temporal database can be written such that the application does not need to be aware of changes that have been made to the database. The application only needs to know how to load a class that is stored in the temporal database. The application does not need to be modified each time a change is made to the schema of the database.

Although the use of a temporal class loader has been described above through the use of an example, embodiments are not limited to the example. For instance, the class definition may not contain any interface functions, and may only contain the structure corresponding to the schema of the database at the time of interest. It may then be left to the application logic itself to interpret the schema that it is presented with. Other alternatives such as this would be readily apparent to one of skill in the art.

Future Modeling

Another advantage of implementations of various embodiments is the ability to model future events. In a traditional relational database, changes to the data model (i.e. the database schema) would require that the database be stopped, an in-place alter be performed, and then the database be restarted. This not only results in time that the user is unable to ask questions of the database, but also result in situations where database personnel may need to perform the database maintenance at inconvenient times, such as the middle of the night, when users are less likely to need access to the system. However, this is not a sufficient solution, as databases may be required to support users across the globe, and a database shutdown may be unacceptable.

Figure 8C:
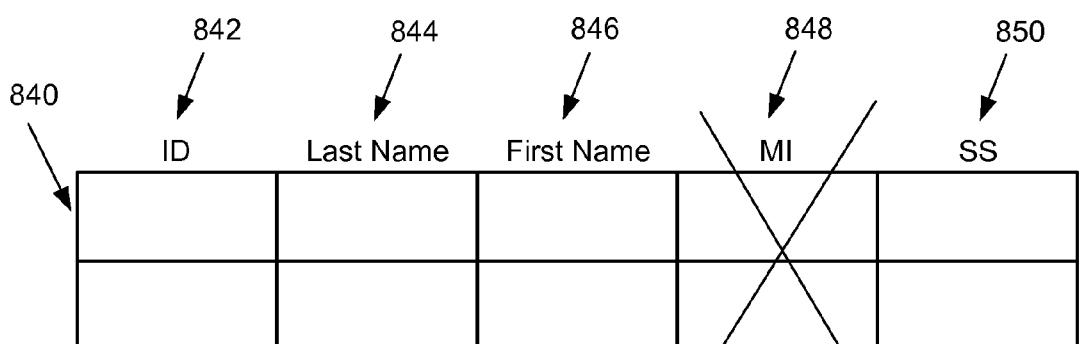

As an example to illustrate the situation where a database may need to be altered, consider the example that has been discussed above, where a database relation containing information about an employee needs to be altered. At some point, as depicted in FIG. 8(c) it may be decided that a new field should be added to the database, such as an employees social security number 850. At the same time it may be decided that the field indicating the middle initial 848 is no longer appropriate to be stored in the database. In a traditional relational database, although preparations for such a change may be made in advance, no changes to the database may be made until the actual change is desired to be effective.

There are many reasons for this. One of these reasons is that applications depending on the database will not be able to handle the changes that result from changes to the database schema. For example, applications that are expecting to receive the field middle initial 848 would no longer work if the field were immediately deleted. Additionally, applications no longer work when additional data that is not expected, such as the social security number 850, begins to appear. As such, changes to the database model and changes to applications that access data stored in the database need to be performed in unison. This modification usually results in a system outage lasting at least as long as the database update and application update require.

In contrast, various embodiments described herein allow for a seamless transition of the database model. Because the database as present herein is fully temporal, with regard to both the data as well as the schema, changes to both can be made with an effective date that is some time in the future. Changes can be made and entered into the database prior to the effective date of the change, and when the effective time of the change comes about, the database is able to handle the change seamlessly because of its fully temporal nature.

Again turning to the example presented, suppose a decision is made on Mar. 1, 2008, that all employees will have their social security numbers 850 stored in the enterprise database. The change is required to be effective starting May 1, 2008. Using the fully temporal database of the present application, database administrators could make a change in the database model and enter this change on Apr. 1, 2008, and set an effective time for the change to be May 1, 2008. Using terms as have been previously described, the event, or decision, time of the data model change may be stored as Mar. 1, 2008, when the decision was made to change the model. The transaction time may be set to be Apr. 1, 2008, when the database administrators actually enter the change to the model. The valid time of the transaction could be set to be May 1, 2008, which is the time that the change is intended to be effective.

When May 1, 2008, comes about, the database will simply be able to use the new model that includes the social security number field, because the valid time of the change has now been reached. Prior to May 1, 2008, the old model that lacks the social security number 850 would be used, because the valid time of the transaction has not yet been reached.

In a similar fashion to the previous example, a decision may have been made to remove the middle initial field 848 from the employee database. This decision may have been made on May 1, 2008, to be effective on Jun. 1, 2008. Database administrators may enter this change into the database at any time after the decision has been made. The change to remove the middle initial field 848 may be entered with a valid time of Jun. 1, 2008. However, it should be noted that the removal of the middle initial field does not involve any actual deletion of the field, or of the data that is associated with the field. The middle initial field 848 will simply have an entry that indicates that at time Jun. 1, 2008, the middle initial field 848 is no longer effective. Any queries after this date will no longer provide the middle initial, although the data and the field still exist in the temporal database, and may become effective again at some point in the future.

As was described above, applications that use a temporal class loader will be able to continue accessing the database seamlessly across all times. As such, there would be no change required to applications accessing the temporal relational database, as the temporal class loader will be utilized to allow the application to use a schema that is appropriate to the database at the time of the database query. Furthermore, although the example was presented in terms of an addition and removal of a field of data, a temporal relational database is not limited to the example. Any value, entity, or relationship that maintains a temporal history, which for a temporal relational database is virtually every value, entity, or relationship, can also be changed with an effective date that is in the future. As such, future modeling applies to all aspects of the temporal relational database.

Simply Querying Across Time

Various embodiments of the present disclosure greatly expand the capabilities of a traditional relational database by adding a temporal dimension to the storage of both the data and the underlying data model. Through the use of these additional capabilities, new and useful queries of the database, that are not possible with traditional relational databases, may be performed. In addition to the benefits that have been discussed above, the temporal relational database will permit a user to query the database while specifying a time of interest. The temporal database will then be able to answer the query and obtain results that can reflect the answers as they would have been at the time of interest.

Because both the data and schema in a temporal database maintain a complete temporal history and future, questions can be asked of the temporal database that span time. Using the familiar example of the employee information database that has been presented throughout this specification, descriptions of the various types of temporal and non-temporal queries are presented below.

Although a temporal database as presented in various embodiments provides for advantageous enhancements to the capabilities of a database, none of the original functionality of a standard database is lost. The database system may be queried to answer questions with the time of interest of the query set to be the current time. As such, the database will be able to provide answers to queries that indicate the values of the data as well as the schema of the data as they exist currently. In terms of the temporal database framework, the queries may be performed with the valid time and transaction time set to be the present (e.g. this instant). The temporal database framework may then search through the temporal histories of all the data and schema and retrieve only those elements whose values indicate that they are valid at this instant in time. As such, the results produced when querying a temporal database with the current time would result in an output that would be identical to that produced by querying a non-temporal version of the database.

One of the enhancements presented by various embodiments can be seen when querying a temporal database to ask questions related to how the database looked in the past. In many cases, such as in the case of a historical audit, the state of the database at the present time is not helpful. What is needed is the ability to ask the database questions about the past, and have the database respond with the same results as if the query was actually performed in the past.

Because the temporal framework of various embodiments maintain temporal histories of all transactions, both data value changes as well as data schema changes, the database can be reconstituted to look as it would have at any point in the past. The query would simply set the transaction time and valid time to be equal to the time in the past that is of interest. By setting the transaction time to the time of interest, the temporal framework can simply ignore any changes that were made to the database, in either values or models, that occurred after the time of interest. Furthermore, by setting the valid time to be the time of interest, the database can also ignore any changes that had been entered into the database prior to the time of interest with a valid time that was later than the time the transaction was entered (e.g., the transaction was entered, with a valid time later than the time of interest).

Another enhancement presented by various embodiments can be seen when querying a temporal database to ask questions related to how the database will look in the future. In some cases, such as in the case where changes to a database are being made with an effective date that is in the future, the state of the database at the present time is not helpful. What is needed is the ability to ask the database questions about the future, and have the database respond with the same results as if the query was actually performed in the future.

Just as in the case above involving querying the temporal database to provide answers to questions posed in the past, the temporal database can also reconstitute the database as it would look at any time in the future. Again, because all transactions, both data and schema changes, are associated with a temporal history, queries for the future state of the database can be performed in the same manner as for queries in the past. The query could simply set the valid time to some point in the future. In the case of future queries, it is not necessary to set the transaction time, because a transaction that has not yet been entered into the database does not exist in the future timeline. The temporal database can then filter out all transactions that have valid time that is greater than the time of interest. As such, the query will then operate on a database that appears the same way it would at some point in the future, based on changes that may have been entered already, but have not yet reached the point in time where they become effective.

Additional examples of querying across time, in terms of an example, will be presented below with respect to managing Roles and Authorities within an Organization.

Applying Temporal Data and Temporal Data Models to Roles and Organizational Structures Embodiments discussed herein can be useful in a wide variety of applications. Any organization that maintains a database, where changes to the database and the data schema are made over time, can make use of a temporal database to not only query the database to answer questions about the past, present, and future, but to also input changes to the database that will not be effective until some point in the future. One exemplary embodiment of an application is presented to show a possible use of a temporal database. Although this exemplary embodiment describes one potential use, the various embodiments are in no way limited to this use.

An exemplary embodiment of an application that is designed to make use of a temporal database is an application designed to manage roles present within an organization. An organization, such as a corporation, typically comprises many different people, performing many different job functions, reporting to different supervisors, with varying levels of authority and responsibility. Keeping track of who a member of an organization reports to, who reports to them, what authorities the member has, and what responsibilities the member has is a task that is normally managed with a database.

One possible way an organization can handle complexities such as this is by defining a set of roles. A role generally is a set of connected permissions, responsibilities, and/or authorities that can be used to allow a user having that role to perform operations, such as accessing or updating various information or executing specific tasks. Such roles can be defined in any way that makes sense for an organization. Some simple examples could be roles such as employee, manager, executive, or the like. Roles can also be continuously changing, as new roles are added and old roles are no longer needed.

Along with roles, permissions, responsibilities or authorities for those role may need to be tracked. For example, an organization may state that a purchase order for an amount under $100.00 requires approval by someone who is designated to have the role of a manager. Whereas for amounts greater than this value, approval by a person who is designated to have the role of executive is required. Another example may be that access to the accounting systems of the organization is restricted to those in the accounting department.

In addition to Roles and Responsibilities, an organization may need to store reporting hierarchies, such as which members report to which supervisors and which executives those supervisors report to. As in the case of roles, these organizational structures can be undergoing continuous changes as the organization structure changes, as people are hired, and as people leave the organization.

In a static world, these Roles and Responsibilities could be stored in a standard relational database. An organization structure could be defined, with all roles being static, with unchanging responsibilities, and all persons staying in their present role permanently. Unfortunately, this is not how most organizations operate. There will typically be changes in all of the areas that have been described above.

A temporal database is well suited to handle this type of application. One of the difficulties that a traditional database has when making changes to the schema of the database, such as adding a new field, such as a new role, is that the database must be stopped, the change inserted, and then restarted. Typically, prior to the point when the desired schema change is to take effect, a copy of the database is made. The schema changes can then be made to the copy, and the existing data migrated to the new schema. At the point in time the change is to become effective, the database is stopped, replaced with the new database, and then restarted. As has been discussed, stopping and restarting the database is not particularly convenient in many situations. Furthermore, any applications that access the database must be updated to operate with the new schema at the time the new database is restarted.

Using a temporal database, changes to the database schema can be made transparently. A user could simply input the new role information into the database, while setting the role to be valid at some point in the future. Employees could be assigned to the role, also designated to become valid at some point in the future. When the future time arrives, the changes that have been made to the database go into effect seamlessly, as has been described above.

Furthermore, organizational structure changes can also be modeled in a temporal database in the same manner. An entire organization could have new roles, reporting structures, and responsibilities assigned in the temporal database, with all of those changes set to have a valid time at some point in the future. When that valid future time arrives, the entire organizational structure will simply switch to the new structure, with no downtime at all.

FIGS. 9(a-c) depict a hypothetical organization that is going through a restructuring. New roles are created, old roles are made ineffective, and ineffective roles are revived to become effective again. The organizational reporting structure undergoes significant changes. People move into and out of roles. Limits for the responsibilities of the roles also undergo changes. Although the application of a temporal database to manage roles and responsibilities in an organization is being presented by way of an example, the example is in no way intended to be limiting.

Figure 9A:
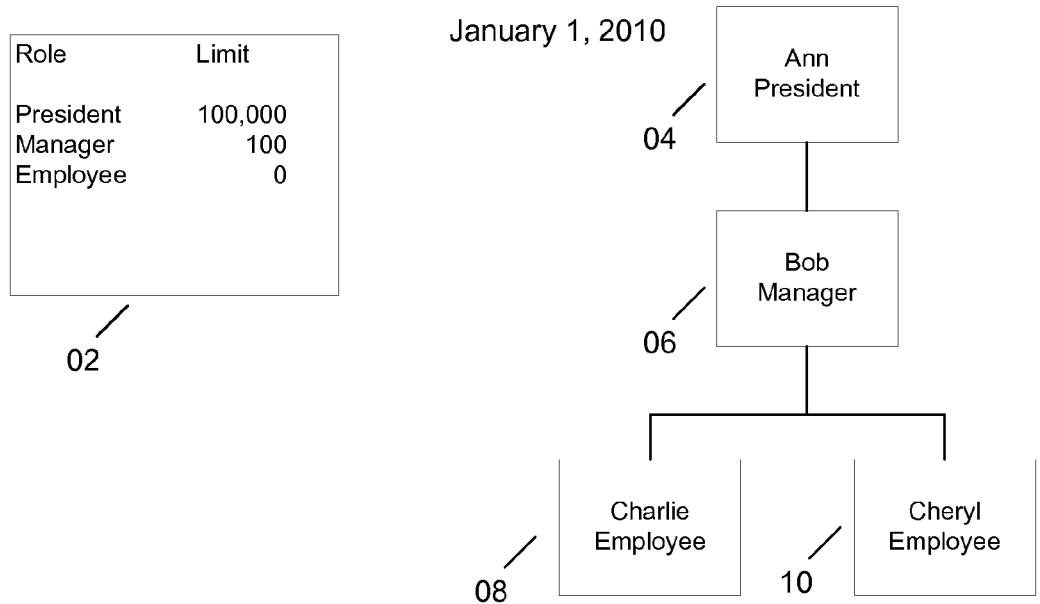
FIGS. 9(a-c) illustrate an exemplary use of a temporal relational database to manage roles and authorities within an organization in accordance with one embodiment.

FIG. 9(a) depicts how the organization may have been structured on a given date, such as Jan. 1, 2010. The organization has defined a set of roles and the authorities that go along with those roles 902. For example, the hypothetical organization may have defined roles of President, Manager, and Employee 902. Each of those roles may be authorized to approve purchase for amounts up to a certain limit 902. In the example, a President, a Manager, and an Employee may approve purchases in the amount of 100,000, 100, and 0 dollars respectively. On Jan. 1, 2010, the organization is defined with Ann 904, who has the role of President, at the top of the hierarchy. Bob 906 is designated to have the role of Manager, and reports to Ann 904. Charlie 908 and Cheryl 910 are both designated to have the role of Employee, and both report to Bob 906. Each of these members of the organization have the authority to approve purchase up to the limit 902 designated by the role they hold.

At some point in time, it is decided that the current organizational structure is inadequate for the organization. This can occur for any number of reasons, such as to further delegate authority. In this example, the President, with an authorization limit of 100,000 dollars is required to approve all but the most trivial of transaction while a Manager is only able to approve trivial transactions. In our example, a decision is made that on Mar. 1, 2010, a new organizational structure will be put in place, with new roles, and different authorities. In a traditional database, at some point prior to Mar. 1, 2010, a copy of the database will be made, the organizational structure changed, the data migrated, and the database stopped, replaced and restarted. Not only does this present problems as discussed above, but additionally introduces the problem that during the period of time changes are being made to the copy of the database, changes in the original database are not reflected in the copy. For a large organization, this can be an overwhelming problem. Problems with changing the structure of the database in this fashion are well known.

The use of a temporal database alleviates the problems associated with organizational changes. At any point after the decision is made to change the organizational structure, the changes can be input into the actual database, not a copy of the database, with all of the changes set to have a valid time that is in the future. Such changes will have no impact on the database as it is running in the present, and when the valid future time arrives, the database simply begins using the new structure.

Figure 9B:
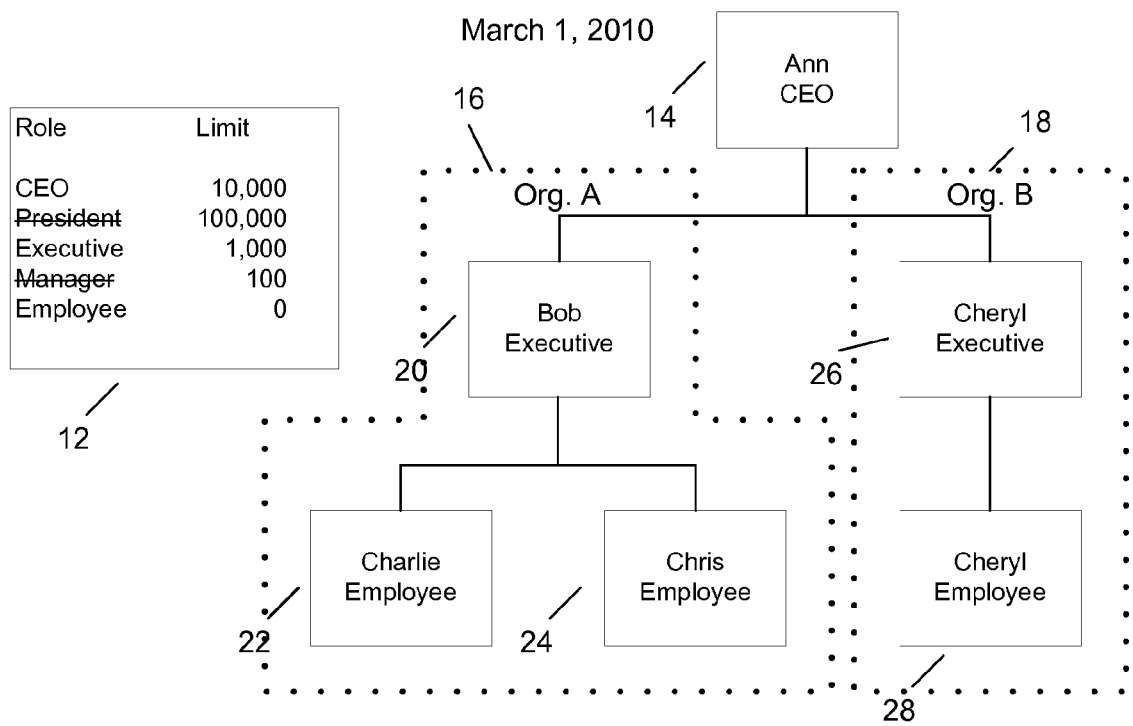

FIG. 9(b) depicts the organization as it should look on Mar. 1, 2010, when the new organizational structure goes into effect. At any time prior to Mar. 1, 2010, the changes to the organizational structure can be made, with a valid time set to be equal to Mar. 1, 2010. In the present example, Ann 914 is still the head of the organization, but her role has changed from President to the newly defined role of CEO 912 that has an authorization limit of 10,000. Reporting to Ann 914 are two new subordinate organizations, Org. A 916 and Org. B 918. The head of Org. A 916 is defined to be Bob 920, who has been assigned the new role of Executive with the corresponding limits. Reporting to Bob 920 are existing Employee Charlie 922 and Chris 924 who have both been assigned the role of Employee.

The head of Org. B 918 is defined to be Cheryl 926 who has been assigned the role of Executive. However, in this example, Cheryl 926 is only being granted the role of executive for a limited time, while a new person is found to fill the position as the head of Org. B 918. Cheryl 926 can be granted the role of executive, valid from Mar. 1, 2010, but she will only be granted the role for a period of four months. In a temporal database, this is easily accomplished by removing the role of executive from Cheryl 926 with a valid time set to be four months in the future. Cheryl 928 is also still granted the role of employee, reporting to the head of Org. B 918, which is temporarily also Cheryl.

Furthermore, the roles of Manager and President 912 are no longer needed, although as should be clear, in a temporal database, when an entity or relationship is no longer needed, the entity or relationship is simply marked ineffective and is not actually deleted.

One thing that is worth pointing out in the example, and has been explained above is that a temporal database can be constrained. As has been explained previously, the constraints will prevent any changes from being made to the database that will result in inconsistencies within the temporal paradigm. To further clarify this in terms of the example, the role of President 912 is no longer needed on Mar. 1, 2010. If the first change to the temporal database is to make ineffective the role of President, valid on Mar. 1, 2010, this change may be rejected. It can be rejected because if the role President is made ineffective, Ann 914 will be assigned a role that is ineffective. Using the terminology presented above, there will be no intersection in valid time between the effective state of the President role, and the role being assigned to Ann. As such, this change, if allowed, would result in a temporal inconsistency. Thus, in order to make changes such as making an entity or relationship ineffective, first all references to the entity or relationship may be removed.

One proper ordering of changes that would not result in temporal constraints being violated would be to first add the role of CEO valid on Mar. 1, 2010. The role of CEO could be assigned to Ann 914 and the role of President removed from Ann 914, both effective on Mar. 1, 2010. The role of President could then be marked ineffective, the change becoming valid on Mar. 1, 2010. This will not be rejected, because looking that database at valid time Mar. 1, 2010, there are no references to the role of President. As such, the President role can be made ineffective on that date, without causing any temporal inconsistencies in the database.

Figure 9C:
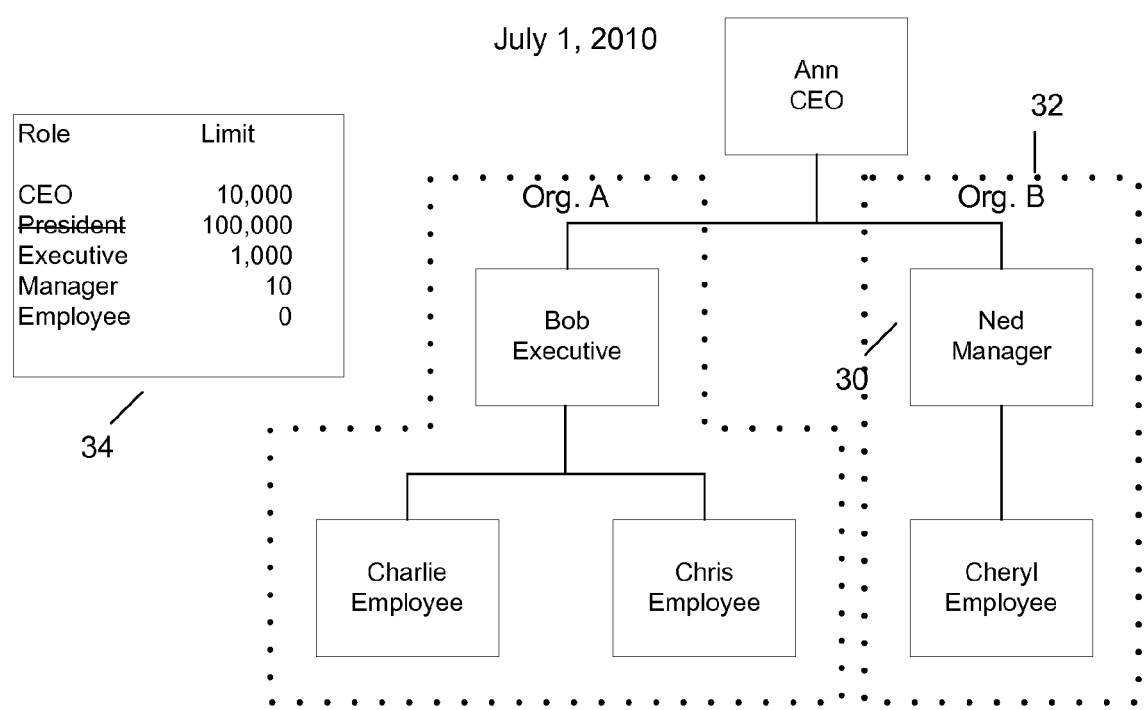

Continuing with the example, FIG. 9(c) depicts a new person, Ned 930, who has been found to take over the role of the head of Org. B 932. Ned's 930 hire date may be on Jul. 1, 2010. However, perhaps the organization decides that being a new person in the organization, and given the size of Org. B 930, the person assigned to that role should not have the authority of an Executive 934. The organization may decide to resurrect the role of Manger 934. Furthermore, the organization may decide that the role of manager should only have approval authority up to 10 dollars. At any time, the role can be changed to be effective, the new limit applied to the role changed to 10 dollars, and Ned 930 can be assigned to head Org. B 932, all the changes set to have a valid time of Jul. 1, 2010. When the valid time of Jul. 10, 2010 arrives, the temporal database instantaneously begins to use the new structure.

A temporal database would be able to answer many different types of questions related to roles and responsibilities, and some examples are presented below. The examples are in no way intended to limit the types of questions a temporal database managing roles and responsibilities may answer. For purposes of clarity, it will be assumed that there are no entries into the temporal relational database that were made in error and require correction. As such, the linear ordered figures depicted with the following examples remain the same with respect to the period in time which they were created. An example of a situation involving a correction will be presented further below. For purposes of the present example, the current date will be Mar. 1, 2010.

Figure 10A:
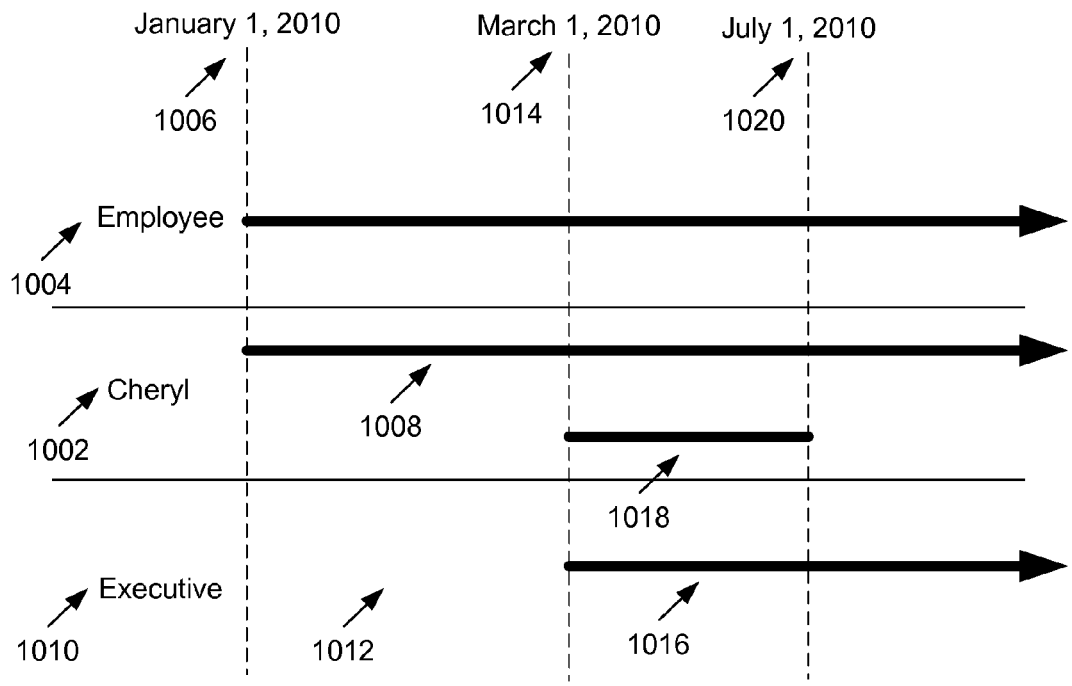
FIGS. 10(a-b) illustrate an exemplary use of a temporal relational database to answer questions related to an organizational structure in accordance with one embodiment.

For auditing and compliance purposes, embodiments of the present invention may be able to report on the state of the system at any point in the past or present or future. Some example questions may be the list of roles Person X held at a date Y in the past, or the list of roles Person X will hold at date Z in the future. FIG. 10(a) depicts the linear ordered roles and relationships of the hypothetical organization presented above, with respect to the person Cheryl. Recalling from above, Cheryl started as an Employee, was temporarily granted the newly created role of Executive, while continuing to maintain the role of Employee, and then had the Executive Role withdrawn. Looking at the linear ordered relationships as depicted in FIG. 10(a), the temporal relational database is able to answer these questions. The temporal relational database does not need to be concerned with what the actual present time is, because the only pertinent information is the valid time of the query. In the continuing example, Cheryl 1002 was assigned the role of Employee 1004 on Jan. 1, 2010 1006. The relationship between Cheryl 1002 and the Employee 1004 role is depicted by line 1008, where solid portions of the line indicate the relationship is effective, and absent portions indicate the relationship is ineffective. At that time, the role of Executive 1010 did not exist 1012. On Mar. 1, 2010 1014, the Executive 1010 role came into existence 1016, and it was also assigned to Cheryl 1002. Similarly, line 1018 depicts where the relation ship between Cheryl 1002 and the Executive role 1010 is effective. On Jul. 1, 2010 1020, Cheryl 1002 lost the role of executive 1010, although the role itself continues to exist. Because of the linear ordering and the concept of successors and predecessors as presented above, the temporal database only needs to be told the valid time of interest for a query, and can then answer the question. To the temporal database, it is irrelevant if the valid time of the query is in the past, the present, or the future, as the linear ordering extends from the creation of the database to an unbounded maximum time. As such, answering the questions presented above is simply a matter of specifying the valid time of interest for the query and determining where intersections in valid time for the query occur.

Figure 10B:
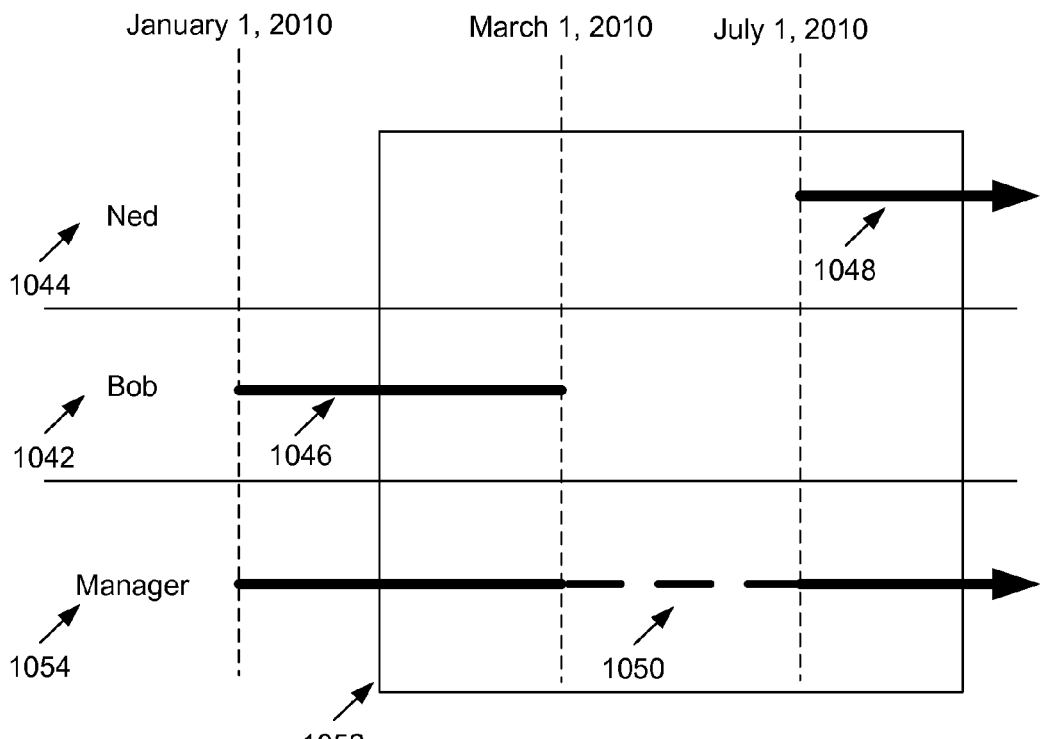

As another example, for auditing and compliance purposes, embodiments of the invention should be able to report on all the changes for a given object over a range of time in the past up until the present. For example, for a given business role, the people who have gained or lost the role over the past six months. FIG. 10(b) depicts the liner ordered pan temporal states of the relationships between the role of manager 1054 and the various persons used in the example. For simplicity, only persons who have gained or lost the role are shown, but it should be understood that all persons in the example also could potentially have such a relationship. As above, the solid lines 1046, 1048 associated with Bob 1042 and Ned 1044 indicate when the relationship is effective. The dashed line 1050 indicates the period in time where the manager role had an ineffective state, and thus could not have anyone assigned to that role. The box 1052 represents the six month period of interest. Answering the question of who held a role in a six month period is simply a matter of traversing the pan temporal linear ordered timeline of the persons who had an effective relationship with the role at any time within the period of interest. As should be clear from FIG. 10(b), Ned 1042 and Bob 1044 both gained or lost the role of manager 1054 within the six month period 1052.

As another example, for organizational management purposes, embodiments of the invention should be able to make changes to the organization model to be made effective at a point in time in the future. For example, Employee X should gain Position Y on Date Z two weeks from today, New Organization A should be added as a child of existing Organization B one week from today, or Organization C can be scheduled to be deleted on a date in the future. As has been explained above with reference to FIG. 9, making changes to the temporal relational database when those changes are effective in the future, is no different than making changes that have a valid date that is in the present or the past. All operations, such as additions, reassignments of roles, removal of roles, etc. will be entered with an indication of the time the change is valid from. From the temporal relational database view, all changes are handled in the same fashion, regardless of when in actual time they occur.

As another example, for organizational management purposes, embodiments of the invention can report on all updates that are scheduled to occur for a give date range in the future. Once again, because the temporal relational database maintains a full temporal history for every change to the database, answering questions about changes that take place in the future is simply a matter of searching the pan temporal linear ordered view of the database, and selecting those items that have a change within the time period of interest. Due to the nature of the temporal relational database, it does not matter if a date of interest is in the past, present, or future in actual time. Because all data and model changes are entered with a starting valid time, and those changes continue on into the future until the changes are superceded by another change, queries involving future events simply search for changes that have not been superceded.

As another example, for standard database queries, the system supports single point in time getting attributes, single point in time searching for attributes, and single point in time relationship "navigation" across all valid times. As should be clear, a temporal relational database would be able to answer questions regarding a specific instant in time, such as all the people who held a given role X on a certain date Y. As has been explained previously, the temporal relational database would simply generate the pan temporal liner ordered view of the database, and questions about a specific time can be answered by looking at the view of the database at that point in time.

Figure 11A:
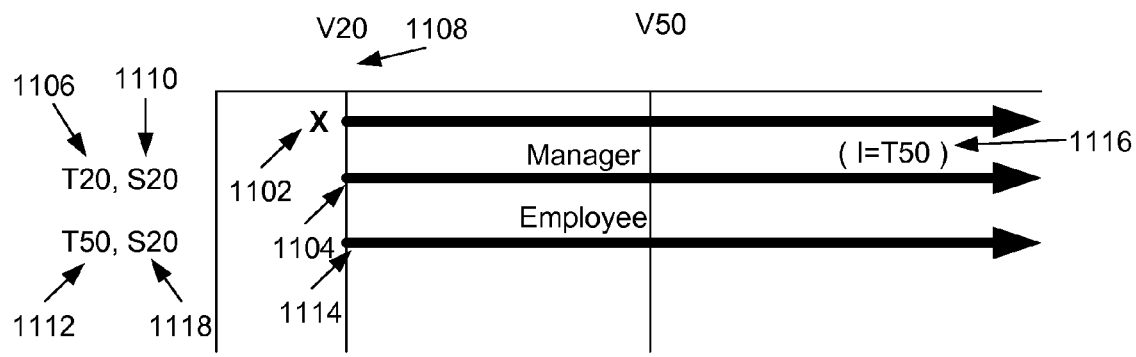
FIGS. 11(a-c) illustrate an exemplary use of a temporal relational database to answer questions related to an organizational structure for purposes of auditing and compliance in accordance with one embodiment.
Figure 11B:
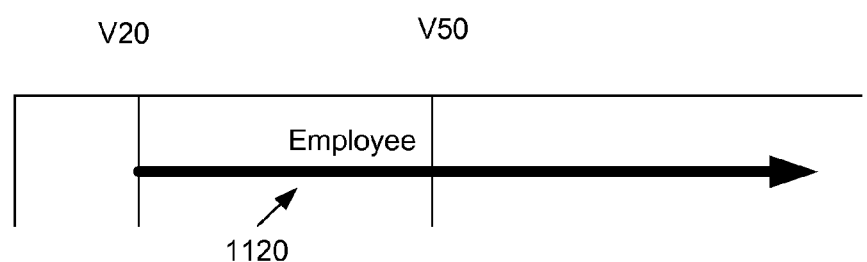
Figure 11C:
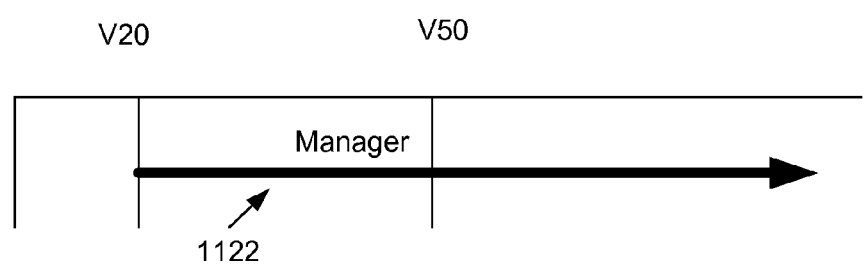

In addition, for compliance and auditing purposes, a temporal database would be able to answer questions about the state of the database in the past. Because the state of the database at any point in time can be reconstituted, the database can be asked questions related to the past, and answer as if the question were actually asked in the past. The temporal database could not only answer questions about roles that were held by a person in the past, according to the databases current view, it could be asked the same question based on the databases historic view. For example, as depicted in FIGS. 11(a-c) Employee X 1102 may have been granted the manager role 1104 at time t20 1106, valid from v20 1108. Because this entry does not involve a correction, the sequence time s20 1110 is set to be the same as the transaction time 1106. Then at time t50 1112, it was realized this was a mistake. A correction was made to indicate this employee should just be a regular employee 1114 set to be effective from time v20 1108, when the error was first introduced. Because this is a correction, the invalidated time is set to 50 1116 which is when the correction was made, and the sequence time is set to s20 1118 to indicate when this error occurred. If the temporal database is queried to see what role the employee had at time 40 1120, according to the current state of the database, it would indicate the employee was not a manager as shown in FIG. 11(b), which depicts the linear ordered pan temporal state of the role associated with Employee X. If the employee performed some action at time 40, such as approving a purchase that could only be approved by a manager, during the time period between time 20, when he was granted the role of manager, and time 50, when the role was corrected, this would be an approved transaction. However, this results in a potential audit and compliance problem, as the current view of the database does not indicate that the employee had the role of manager at time 40. By reconstituting the database at time 40, by filtering all transactions that have a transaction time later than time 40 and creating the linear ordered pan temporal view as shown in FIG. 11(*c*), it would be seen that according to the state of the database at that time, this employee was granted the role of manager 1122, and that is why he was allowed to approve the transaction.

Operating Environment

Figure 12:
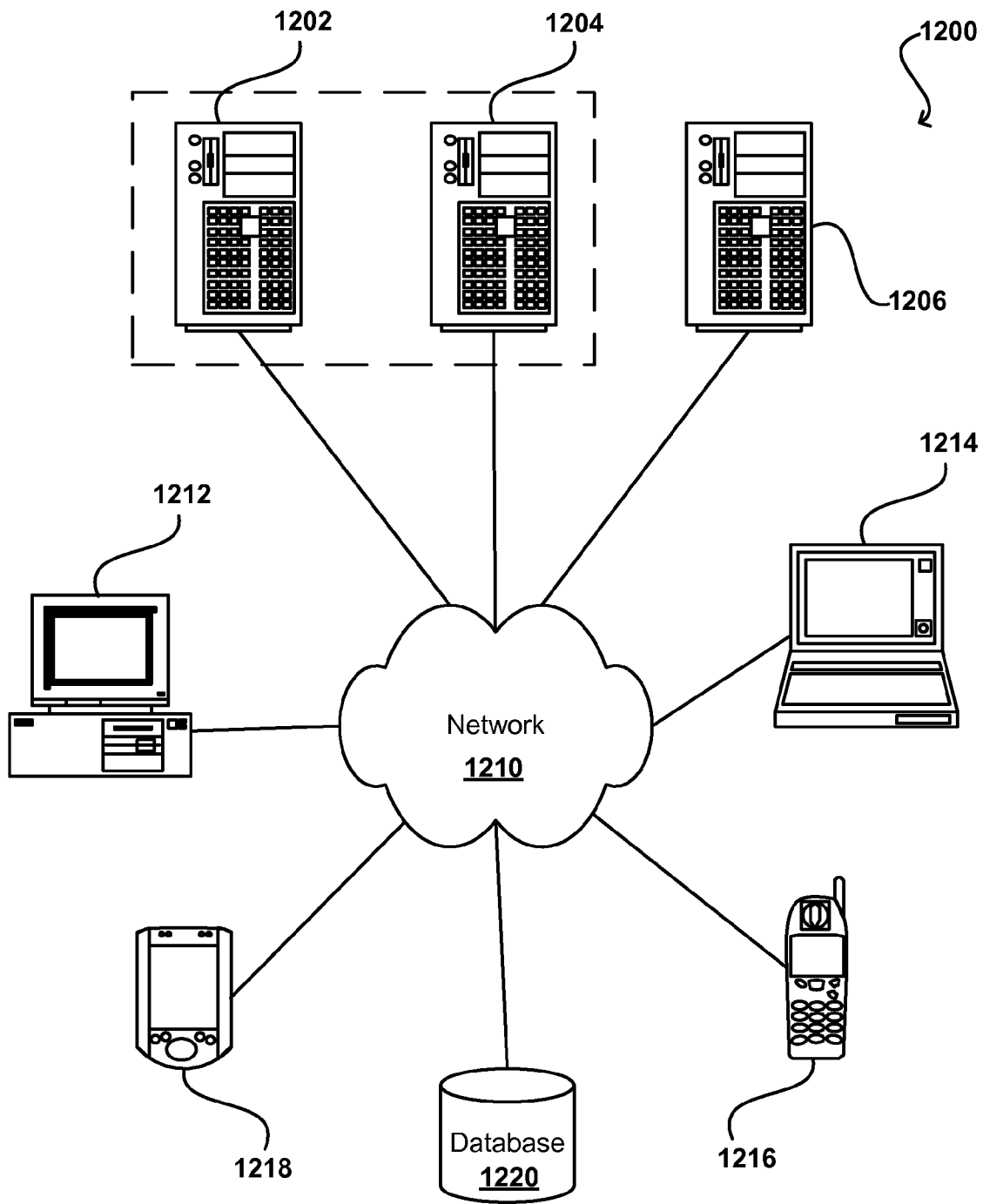
FIG. 12 illustrates components of a computer network that can be used in accordance with one embodiment.

FIG. 12 is a block diagram illustrating components of an exemplary operating environment in which various embodiments may be implemented. The system 1200 can include one or more user computers, computing devices, or processing devices 1212, 1214, 1216, 1218, which can be used to operate a client, such as a dedicated application, web browser, etc. The user computers 1212, 1214, 1216, 1218 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1212, 1214, 1216, 1218 may also have any of a variety of applications, including one or more development systems, database client and/or server applications, and Web browser applications. Alternatively, the user computers 1212, 1214, 1216, 1218 may be any other electronic device, such as a thin-client computer, Internet-enabled gaming system, and/or personal messaging device, capable of communicating via a network (e.g., the network 1210 described below) and/or displaying and navigating Web pages or other types of electronic documents. Although the exemplary system 1200 is shown with four user computers, any number of user computers may be supported.

In most embodiments, the system 1200 includes some type of network 1210. The network may can be any type of network familiar to those skilled in the art that can support data communications using any of a variety of commercially-available protocols, including without limitation TCP/IP, SNA, IPX, AppleTalk, and the like. Merely by way of example, the network 1210 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1202, 1204, 1206 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1206) may be dedicated to running applications, such as a business application, a Web server, application server, etc. Such servers may be used to process requests from user computers 1212, 1214, 1216, 1218. The applications can also include any number of applications for controlling access to resources of the servers 1202, 1204, 1206.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1212, 1214, 1216, 1218. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1212, 1214, 1216, 1218.

The system 1200 may also include one or more databases 1220. The database(s) 1220 may reside in a variety of locations. By way of example, a database 1220 may reside on a storage medium local to (and/or resident in) one or more of the computers 1202, 1204, 1206, 1212, 1214, 1216, 1218. Alternatively, it may be remote from any or all of the computers 1202, 1204, 1206, 1212, 1214, 1216, 1218, and/or in communication (e.g., via the network 1210) with one or more of these. In a particular set of embodiments, the database 1220 may reside in a storage-area network ("SAN") familiar to those skilled in the art. Similarly, any necessary files for performing the functions attributed to the computers 1202, 1204, 1206, 1212, 1214, 1216, 1218 may be stored locally on the respective computer and/or remotely, as appropriate. In one set of embodiments, the database 1220 may be a relational database, such as Oracle 10g, that is adapted to store, update, and retrieve data in response to SQL-formatted commands.

Figure 13:
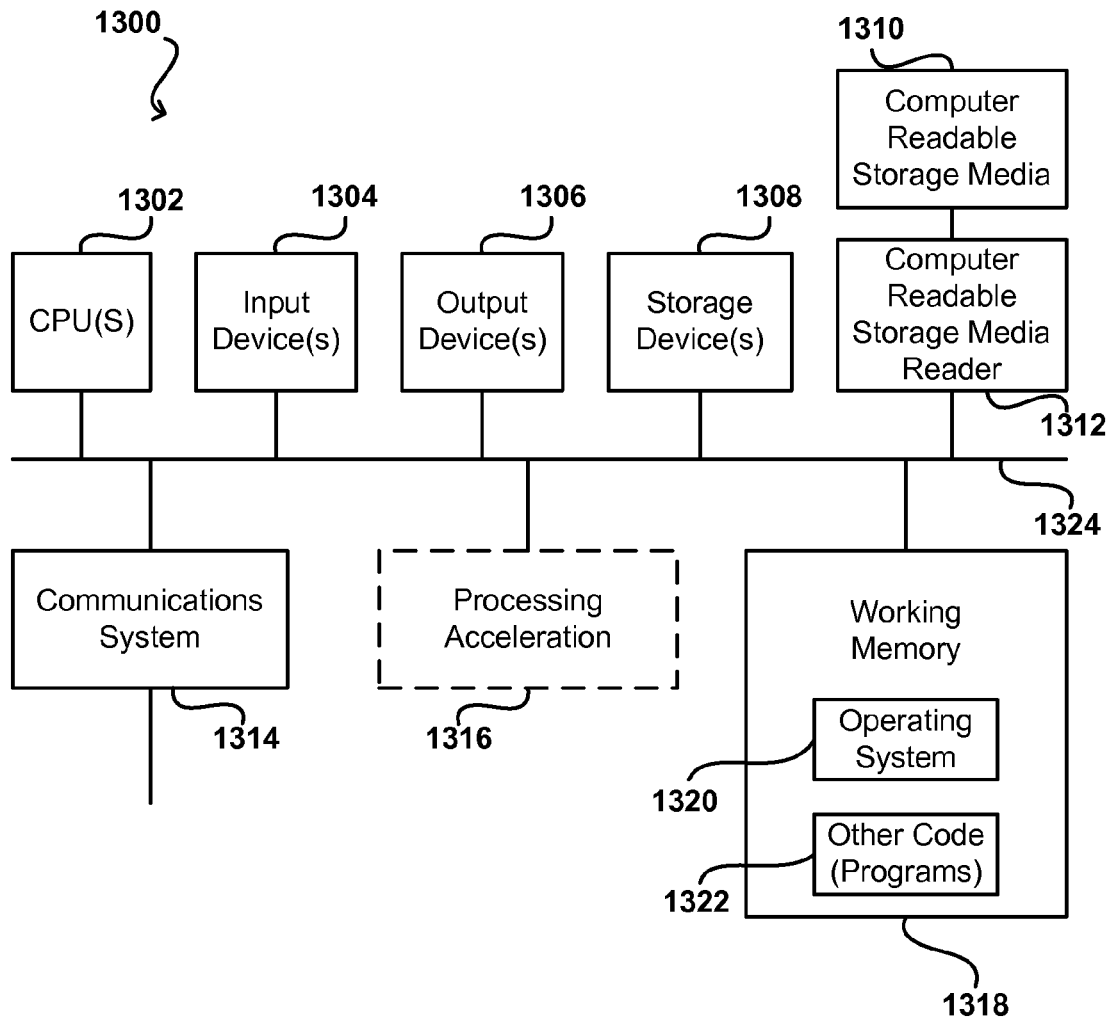
FIG. 13 illustrates components of a computerized device that can be used in accordance with one embodiment.

FIG. 13 illustrates an exemplary computer system 1300, in which various embodiments may be implemented. The system 1300 may be used to implement any of the computer systems described above. The computer system 1300 is shown comprising hardware elements that may be electrically coupled via a bus 1324. The hardware elements may include one or more central processing units (CPUs) 1302, one or more input devices 1304 (e.g., a mouse, a keyboard, etc.), and one or more output devices 1306 (e.g., a display device, a printer, etc.). The computer system 1300 may also include one or more storage devices 1308. By way of example, the storage device(s) 1308 can include devices such as disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1312, a communications system 1314 (e.g., a modem, a network card (wireless or wired), an infra-red communication device, etc.), and working memory 1318, which may include RAM and ROM devices as described above. In some embodiments, the computer system 1300 may also include a processing acceleration unit 1316, which can include a digital signal processor DSP, a special-purpose processor, and/or the like.

The computer-readable storage media reader 1312 can further be connected to a computer-readable storage medium 1310, together (and, optionally, in combination with storage device(s) 1308) comprehensively representing remote, local, fixed, and/or removable storage devices plus storage media for temporarily and/or more permanently containing, storing, transmitting, and retrieving computer-readable information. The communications system 1314 may permit data to be exchanged with the network and/or any other computer described above with respect to the system 1300.

The computer system 1300 may also comprise software elements, shown as being currently located within a working memory 1318, including an operating system 1320 and/or other code 1322, such as an application program (which may be a client application, Web browser, mid-tier application, RDBMS, etc.). It should be appreciated that alternate embodiments of a computer system 1300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of responding to a query from an application to a temporal relational database implemented on a computer apparatus, the method comprising:
   receiving the query at the temporal relational database, the query corresponding to a point in time for which the temporal relational database should be reconstituted;
   using a class loader, retrieving, from the temporal relational database, a class definition representing a structure of the temporal relational database that is appropriate for the query that is being performed at a point in time that the class definition is requested by the query;
   compiling the class definition into a format readable by the application upon every change to the temporal relational database schema;
   storing the compiled class definition as an attribute value in the temporal relational database, the value being stored with a full temporal history; and
   sending the class definition to the application,
   wherein the application utilizes the class definition for the point in time to perform the query of the temporal relational database responsive to the point in time.

2. The method of claim 1 wherein the class definition includes the schema of the temporal relational database for the point in time and at least one interface to the class definition, the interface defining a function that may be performed on data stored using the schema.

3. The method of claim 1 wherein retrieving the class definition from the temporal database comprises using the temporal history stored for at least one compiled class definition to retrieve the at least one compiled class definition that is valid for the point in time indicated in the query.

4. The method of claim 1 wherein the at least one compiled class definition includes at least one interface, the interface defining a function that may be performed on data stored using a predetermined schema.

5. A computer program product embedded in a non-transitory computer readable medium for responding to a query from an application to a temporal relational database, the computer program product comprising:
   computer code for receiving the query at the temporal relational database, the query indicating a point in time for which the temporal relational database should be reconstituted;
   computer code for obtaining a definition of a schema from the temporal database that represents a structure of the temporal relational database for the point in time for which the temporal relational database should be reconstituted;
   compiling the definition of the schema into a format readable by the application upon every change to the temporal relational database schema;
   storing the compiled definition of the scheme as an attribute value in the temporal relational database, the value being stored with a full temporal history; and
   computer code for sending the definition of the schema retrieved from the temporal database to the application,
   wherein the application utilizes the definition of the schema for the point in time to perform the query of the temporal relational database responsive to the point in time.

6. The computer program product of claim 5 wherein the definition of the schema of the temporal relational database is a class definition.

7. The computer program product of claim 5 wherein the definition of the schema includes the schema of the temporal relational database for the point in time and at least one interface to the class definition, the interface defining a function that may be performed on data stored using the schema.

8. The computer program product of claim 5 wherein the computer code for obtaining the definition of a schema includes computer code for using the temporal history stored for the compiled class definition to retrieve the compiled class definition that is valid for the point in time indicated in the query.

9. A system for responding to a query from an application to a temporal relational database, the system comprising;
   a processor operable to execute instructions; and
   a data storage medium for storing the instructions which, when executed by the processor, cause the processor to:
   receive the query at the temporal relational database, the query indicating a point in time for which the temporal relational database should be reconstituted;
   obtain a definition of a schema from the temporal database that represents a structure of the temporal relational database for the point in time for which the temporal relational database should be reconstituted;

compile the class definition into a format readable by the application upon every change to the temporal relational database schema;

store the compiled class definition as an attribute value in the temporal relational database, the value being stored with a full temporal history; and send the definition of the schema retrieved from the temporal database to the application, wherein the application utilizes the definition of the schema for the point in time to perform the query of the temporal relational database responsive to the point in time.

10. The system of claim 9 wherein the definition of the schema of the temporal relational database is a class definition.

11. The system of claim 9 wherein the definition of the schema includes the schema of the temporal relational database for the point in time and at least one interface to the class definition, the interface defining a function that may be performed on data stored using the schema.

12. The system of claim 9 where to obtain the definition of a schema the processor is further caused to use the temporal history for the compiled class definition to retrieve the compiled class definition that is valid for the point in time indicated in the query.

* * * * *

UNITED STATES PATENT AND TRADEMARK OFFICE
CERTIFICATE OF CORRECTION

PATENT NO. : 8,396,863 B2
APPLICATION NO. : 12/326785
DATED : March 12, 2013
INVENTOR(S) : Hughes It is certified that error appears in the above-identified patent and that said Letters Patent is hereby corrected as shown below:

In the Specification

In column 9, line 33, delete "bee" and insert -- be --, therefor.

In column 9, line 36, delete "retuned." and insert -- returned. --, therefor.

In column 11, line 15, after "FIG. 6(c)" insert -- . --.

In column 11, line 67, delete "timeliness" and insert -- timelines. --, therefor.

In column 12, line 65, delete "timeliness" and insert -- timelines. --, therefor.

In column 16, line 58, delete "know" and insert -- known --, therefor.

In column 25, line 28, delete "relation ship" and insert -- relationship --, therefor.

In column 27, line 56, delete "GRPS," and insert -- GPRS, --, therefor.

In the Claims

In column 32, line 9, in Claim 12, delete "where" and insert -- wherein --, therefor.

In column 32, line 11, in Claim 12, after "history" insert -- stored --.

Signed and Sealed this
Twenty-third Day of July, 2013

Teresa Stanek Rea
*Acting Director of the United States Patent and Trademark Office*